US011783618B2

(12) United States Patent
Song et al.

(10) Patent No.: US 11,783,618 B2
(45) Date of Patent: Oct. 10, 2023

(54) FINGERPRINT SENSOR, METHOD FOR MANUFACTURING FINGERPRINT SENSOR, AND DISPLAY DEVICE INCLUDING FINGERPRINT SENSOR

(71) Applicant: Samsung Display Co., LTD., Yongin-si (KR)

(72) Inventors: Bo Kwang Song, Hwaseong-si (KR); Gee Bum Kim, Seoul (KR); Byung Han Yoo, Suwon-si (KR); Dae Young Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 14 days.

(21) Appl. No.: 17/365,956

(22) Filed: Jul. 1, 2021

(65) Prior Publication Data

US 2022/0043995 A1 Feb. 10, 2022

(30) Foreign Application Priority Data

Aug. 6, 2020 (KR) .................. 10-2020-0098337

(51) Int. Cl.
*G06V 40/13* (2022.01)
*G06F 3/041* (2006.01)
*G06F 3/042* (2006.01)

(52) U.S. Cl.
CPC ........ *G06V 40/1318* (2022.01); *G06F 3/0412* (2013.01); *G06F 3/0421* (2013.01); *G06F 2203/04103* (2013.01)

(58) Field of Classification Search
CPC . G06V 40/1318; G06F 3/0412; G06F 3/0421; G06F 2203/04103; G06F 1/1637; G06F 21/32; G06F 3/042; H04M 1/0266; H04M 1/026
See application file for complete search history.

(56) References Cited

U.S. PATENT DOCUMENTS

| | | | |
|---|---|---|---|
| 5,726,443 A * | 3/1998 | Immega | G06V 40/1312 250/221 |
| 10,229,316 B2 * | 3/2019 | Wickboldt | G02B 13/24 |
| 2017/0161540 A1 * | 6/2017 | Mienko | H01L 27/14623 |
| 2018/0033835 A1 * | 2/2018 | Zeng | G06V 40/1376 |
| 2019/0019009 A1 * | 1/2019 | Wu | G06V 40/1318 |
| 2019/0179488 A1 * | 6/2019 | Klenkler | G06F 3/0421 |
| 2021/0174048 A1 * | 6/2021 | Song | G06V 40/1329 |
| 2021/0406503 A1 * | 12/2021 | Hu | G02F 1/13318 |
| 2022/0069034 A1 | 3/2022 | Yoo et al. | |

FOREIGN PATENT DOCUMENTS

| | | |
|---|---|---|
| CN | 208903279 | 5/2019 |
| CN | 210721492 | 6/2020 |
| KR | 2018-0053422 | 5/2018 |

* cited by examiner

*Primary Examiner* — Jonathan A Boyd
(74) *Attorney, Agent, or Firm* — H.C. Park & Associates, PLC

(57) ABSTRACT

A fingerprint sensor for a display device includes a light sensing layer including a light sensing element, and an optical layer including a light transmitter disposed in a light-transmitting area and a light blocker disposed in a light-blocking area. The light-transmitting area includes a plurality of unit light-transmitting areas separated by the light-blocking area, and each of the unit light-transmitting areas has a first width and the light-blocking area has a second width, the first width being in a range of about 5 times to about 200 times the second width.

12 Claims, 18 Drawing Sheets

FINGERPRINT SENSOR, METHOD FOR MANUFACTURING FINGERPRINT SENSOR, AND DISPLAY DEVICE INCLUDING FINGERPRINT SENSOR

CROSS-REFERENCE TO RELATED APPLICATION

This application claims priority from and the benefit of Korean Patent Application No. 10-2020-0098337 filed on Aug. 6, 2020, which is hereby incorporated by reference for all purposes as if fully set forth herein.

BACKGROUND

Field

Embodiments of the invention relate generally to a display device, and more specifically, to a fingerprint sensor, a method of manufacturing the fingerprint sensor, and a display device including the fingerprint sensor.

Discussion of the Background

Display devices are used in various electronic appliances such as smart phones, tablets, notebook computers, monitors, and TVs. Recently, with the development of mobile communication technology, the use of portable electronic appliances such as smart phones, tablets, and notebook computers has greatly increased.

A portable electronic appliance stores privacy information such as contact information, call history, messages, photographs, memos, user's web surfing information, location information, and financial information. In order to protect personal information of a portable electronic appliance, fingerprint authentication is used to authenticate a fingerprint which is a user's biometric information. In this case, a display device may include a fingerprint sensor for fingerprint authentication. The fingerprint sensor may be implemented using an optical method, an ultrasonic method, or a capacitive method. The optical fingerprint sensor may include a collimator having a light sensing unit for sensing light, an opening for providing light to the light sensing unit, and a light blocking unit for blocking light.

The above information disclosed in this Background section is only for understanding of the background of the inventive concepts, and, therefore, it may contain information that does not constitute prior art.

SUMMARY

Applicant recognized that when a fingerprint sensor is disposed in the bezel area or non-display area of a display device, there is a limitation in the ability to widen the display area of the display device. Also, Applicant discovered that the fingerprint sensor can be disposed in the display area of the display device without adversely affecting performance or reliability.

Fingerprint sensors and display devices including the same constructed according to the principles and embodiments of the invention and illustrative methods for manufacturing the same are capable of improving fingerprint recognition accuracy by, e.g., reducing the area of a light blocking unit of a collimator of the fingerprint sensor to increase the amount of incident light.

Additional features of the inventive concepts will be set forth in the description which follows, and in part will be apparent from the description, or may be learned by practice of the inventive concepts.

According to one aspect of the invention, a fingerprint sensor for a display device includes a light sensing layer including a light sensing element, and an optical layer including a light transmitter disposed in a light-transmitting area and a light blocker disposed in a light-blocking area. The light-transmitting area includes a plurality of unit light-transmitting areas separated by the light-blocking area, and each of the unit light-transmitting areas has a first width and the light-blocking area has a second width, the first width being in a range of about 5 times to about 200 times the second width.

The first width may be in a range of about 1 µm to about 10 µm, and the second width is in a range of about 50 nm to about 200 nm.

The light blocker may include a light-blocking member including a base portion having a substantially constant width and a tip portion connected to the base portion and having a width decreasing in a direction toward an upper end thereof.

One side surface of the tip portion may have a generally round shape.

The light transmitter may include a light-transmitting member being further disposed in the light-blocking area, and overlapping the light-blocking member.

The light blocker may have a width that increases in a direction toward an upper end thereof, and one of one side surface and the other side surface of the light blocker may be inclined with respect to a thickness direction.

The light transmitter may have a width that decreases in a direction toward an upper end thereof, and one of one side surface and the other side surface of the light transmitter may be inclined with respect to the thickness direction.

The light blocker may include a metal material.

The metal material may include titanium (Ti).

According to another aspect of the invention, a display device includes a display panel, and a fingerprint sensor disposed on one surface of the display panel, wherein the fingerprint sensor includes: a light sensing layer including a light sensing element, and an optical layer including a light transmitter and a light blocker surrounding the light transmitter. The light blocker includes a base portion having a substantially constant width and a tip portion connected to the base portion and having a width decreasing in a direction toward an upper end thereof.

One side surface of the tip portion may have a generally round shape.

The light blocker may have a width that increases in a direction toward an upper end thereof, and one of one side surface and the other side surface of the light blocker may be inclined with respect to a thickness direction.

A width of the light transmitter may have a width that decreases in a direction toward an upper end thereof, and one of one side surface and the other side surface of the light transmitter may be inclined with respect to the thickness direction.

The light transmitter may have a first width and the light blocker has a second width, the first width being in a range of about 5 times to about 200 times the second width.

The first width may be in a range of about 1 µm to about 10 µm, and the second width is in a range of about 50 nm to about 200 nm.

The light blocker may include a metal material.

According to still another aspect of the invention, a method of manufacturing a display device includes the steps of: forming a first organic material layer on a light sensing layer, patterning the first organic material layer using an etching mask to form a remaining portion in which the first organic material layer remains and an exposed portion exposing the light sensing layer, forming a light blocker to cover a side surface of the first organic material layer in the remaining portion, and filling the exposed portion with a second organic material layer, wherein each of the first organic material layer and the second organic material layer has higher light transmittance than the light blocker.

The step of forming the light blocker may include the steps of: forming a light blocker material layer to cover upper and side surfaces of the first organic material layer in the remaining portion and the light sensing layer exposed by the exposed portion; and etching the light blocker material layer covering the upper surface of the first organic material layer and the light sensing layer. The step of etching the light blocker material layer may be performed by dry etching.

The light blocker disposed in the light-blocking area may include a base portion having a substantially constant width and a tip portion connected to the base portion and having a width decreasing in a direction toward an upper end thereof.

One side surface of the tip portion may have a generally round shape.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
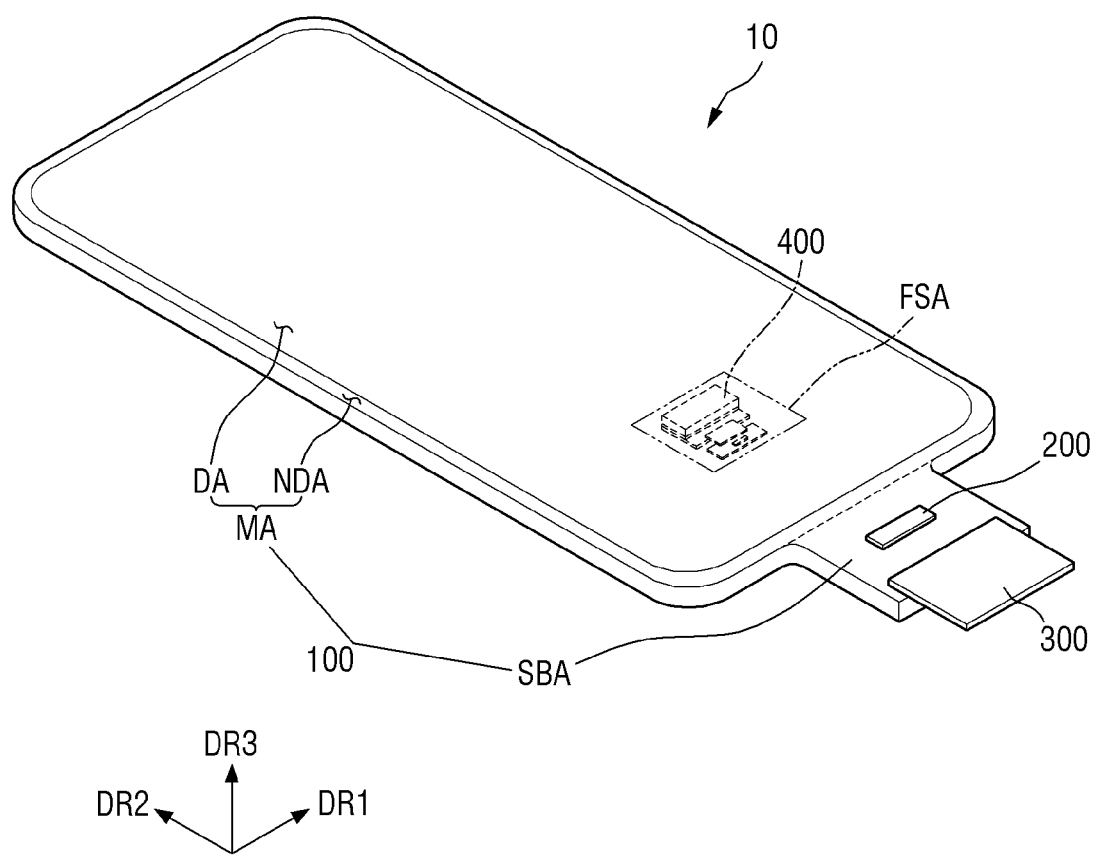
FIG. 1 is a perspective view of an embodiment of a display device constructed according to the principles of the invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a perspective view of an embodiment of a display device constructed according to the principles of the invention.

Referring to FIG. 1, a display device 10, which is a device to display a moving image or a still image, may be used as a display screen of various products such as televisions, notebooks, monitors, billboards, internet of things (IOTs) as well as portable electronic appliances such as mobile phones, smart phones, tablet personal computers (tablet PCs), smart watches, watch phones, mobile communication terminals, electronic notebooks, electronic books, portable multimedia players (PMPs), navigators, and ultra mobile PCs (UMPCs).

The display device 10 may be a light-emitting display device such as an organic light-emitting display device using an organic light-emitting diode, a quantum dot light-emitting display device including a quantum dot light-emitting layer, an inorganic light-emitting display device including an inorganic semiconductor, a micro light-emitting display device using a micro light-emitting diode (LED), or other known display device. Hereinafter, the display device 10 will be mainly described as an organic light-emitting display device, but the embodiments are not limited thereto. For example, in some embodiments, other types of display devices such as a liquid crystal display device, a quantum dot liquid crystal display device, a quantum nano light-emitting display panel (nano NED), and a micro LED may be employed as the display device 10.

The display device 10 includes a display panel 100, a display driving circuit 200, a circuit board 300, and a fingerprint sensor 400.

The display panel 100 may include a display area DA in which an image is displayed and a non-display area NDA in which no image is displayed. The display panel 100 may be divided into a display area DA and a non-display area NDA in a plan view. The non-display area NDA may be disposed to at least partially surround the display area DA. The non-display area NDA may form a bezel.

The display area DA may have a generally rectangular shape having right-angled corners or rounded corners when view in plan. In the drawings, there is exemplified a case in which short sides of the rectangle of the display area DA extend in the first direction DR1 and long sides thereof extend in the second direction DR2 perpendicular to the first direction DR1. The planar shape of the display area DA is not limited to a generally rectangular shape, and may be formed in a generally circular shape, a generally elliptical shape, and other various shapes.

The display area DA may include a plurality of pixels. The pixels may be arranged in a matrix shape. Each of the pixels may include a light-emitting layer and a circuit layer controlling the amount of light emitted from the light-emitting layer. The circuit layer may include a wiring, an electrode, and at least one transistor. The light-emitting layer may include an organic light-emitting material. The light-emitting layer may be sealed by an encapsulation film.

The display area DA may include a fingerprint sensing area FSA. The fingerprint sensing area FSA may sense a user's fingerprint. The fingerprint sensor 400 may be disposed in the fingerprint sensing area FSA. The fingerprint sensing area FSA may be located in a part of the display area DA, but the embodiments are not limited thereto. For example, the fingerprint sensing area FSA may be substantially the same as the display area DA, and may overlap the entire display area DA.

The non-display area NDA may surround all sides of the display area DA, and may form a frame of the display area DA. However, the embodiments are not limited thereto.

The display panel 100 may be flexibly formed to be warped, curved, bent, folded, or rolled. However, the embodiments are not limited thereto.

The display panel 100 may include a main area MA and a sub-area SBA.

A display area DA, a non-display area NDA, and a fingerprint sensing area FSA may be located in the main area MA. The main area MA may have a shape similar to the planar appearance of the display device 10. The main area MA may be a substantially flat area located in one plane. However, the embodiments are not limited thereto, and at least one of the edges other than the edges (sides) connected to a bending area BA in the main area MA may be bent to form a curved surface or may be bent in a vertical direction.

The sub-area SBA may protrude in the second direction DR2 from one side of the main area MA. The length of the sub-area SBA in the first direction DR1 may be smaller than the length of the main area MA the first direction DR1, and the length of the sub-area SBA in the second direction DR2 may be smaller than the length of the main area MA in the second direction DR2, but the embodiments are not limited thereto.

Although it is illustrated in the drawings that the sub-area SBA is unfolded, the sub-area SBA may be bent. That is, the sub-area SBA may be bent with a curvature in a direction opposite to the display surface. In this case, the surface of the sub-area SBA is reversed, and at least a part of the sub-area SBA may be disposed on the lower surface of the display panel 100. When the sub-area SBA is bent, the sub-area SBA may overlap the main area MA in the thickness direction. Here, the thickness direction may mean a third direction DR3 perpendicular to each of the first direction DR1 and the second direction DR2. The display driving circuit 200 may be disposed in the sub-area SBA.

The display driving circuit 200 may generate signals and voltages for driving the display panel 100. The display driving circuit 200 may be formed as an integrated circuit (IC), and attached onto the display panel 100 by a chip on glass (COG) method, a chip on plastic (COP) method, or an ultrasonic bonding method, but the embodiments are not limited thereto. For example, the display driving circuit 200 may be attached onto the circuit board 300 in a chip on film (COF) method.

The circuit board 300 may be attached to one end of the sub-area SBA of the display panel 100 by using an anisotropic conductive film or ultrasonic bonding. Through this, the circuit board 300 may be electrically connected to the display panel 100 and the display driving circuit 200. The display panel 100 and the display driving circuit 200 may receive digital video data, timing signals, and driving voltages through the circuit board 300. The circuit board 300 may be a flexible printed circuit board, a printed circuit board, or a flexible film such as a chip on film.

The fingerprint sensor 400 may be disposed on the lower surface of the display panel 100. The fingerprint sensor 400 may be disposed within the display area DA. For example, the fingerprint sensor 400 may be disposed in the fingerprint sensing area FSA disposed in the display area DA. The fingerprint sensor 400 may be attached to the lower surface of the display panel 100 using a transparent adhesive member. The transparent adhesive member may be, for example, a transparent adhesive film such as an optically clear adhesive (OCA) film or a transparent adhesive resin such as an optically clear resin (OCR).

Figure 2:
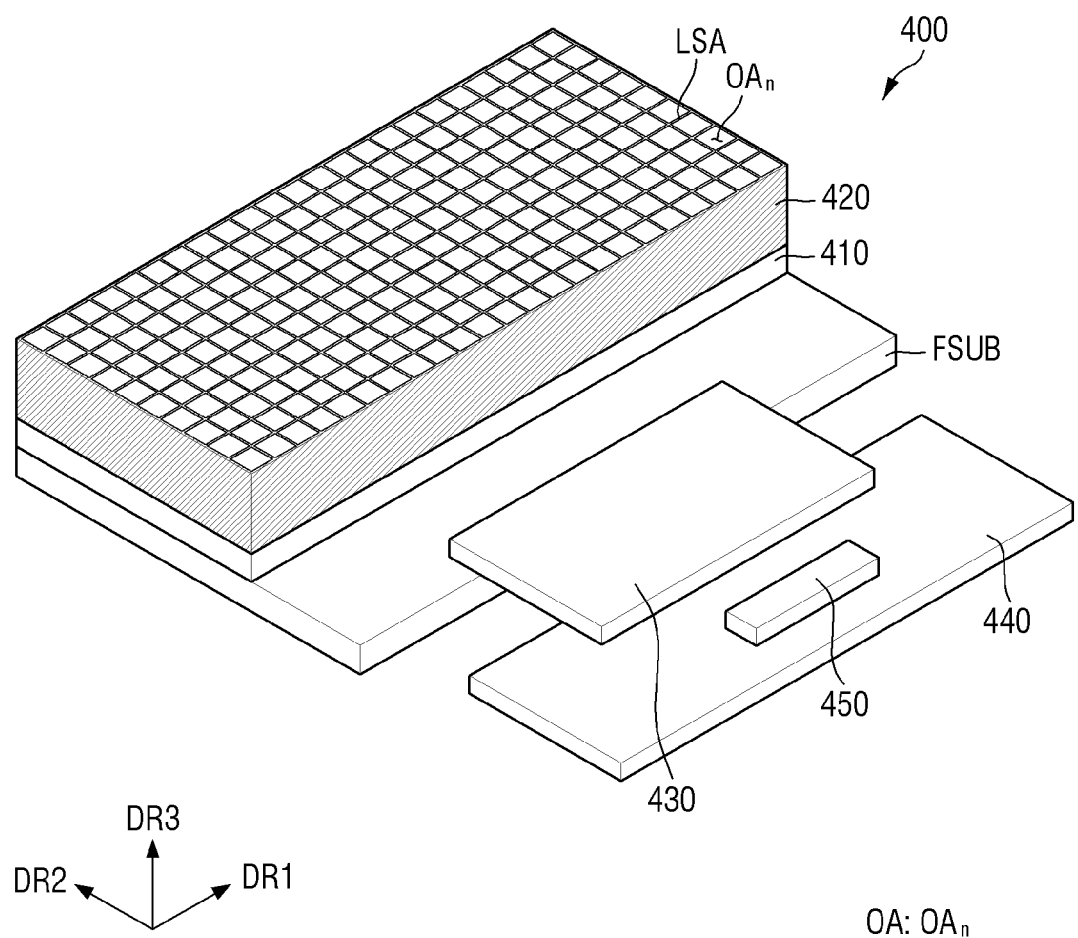
FIG. 2 is a perspective view of an embodiment of the fingerprint sensor of FIG. 1 constructed according to the principles of the invention.

FIG. 2 is a perspective view of an embodiment of the fingerprint sensor of FIG. 1 constructed according to the principles of the invention.

Referring to FIG. 2, the fingerprint sensor 400 may include a fingerprint sensor substrate FSUB, a light sensing layer 410, an optical layer 420, a flexible film 430, a sensor circuit board 440, and a sensor driving circuit 450.

The fingerprint sensor substrate FSUB may support components disposed thereon. The fingerprint sensor substrate FSUB may include an insulating material such as glass or polymer resin. For example, the fingerprint sensor substrate FSUB may include polyimide. The fingerprint sensor substrates FSUB may be a flexible substrate capable of bending, folding, rolling, or the like.

The light sensing layer 410 may be disposed on the fingerprint sensor substrate FSUB. The light sensing layer 410 may include a plurality of sensor pixels SP (refer to FIG. 3) arranged in the first direction DR1 and the second direction DR2. For example, referring to FIG. 6, each of the sensor pixels SP may include a light sensing element PD through which a sensing current flows according to incident light and at least one transistor ST1 connected to the light sensing element. The light sensing element may include a photo diode or a photo transistor.

The optical layer 420 may be disposed on the light sensing layer 410. an infrared filter layer may be further disposed on the optical layer 420, or an infrared filter layer may be further disposed between the optical layer 420 and the light sensing layer 410.

The optical layer 420 may include a first area and a second area having different transmittances from each other. The transmittance of the first area may be greater than that of the second area. In an embodiment, the first area may be a light-transmitting area OA that generally transmits light, and the second area may be a light-blocking area LSA that substantially blocks light. Hereinafter, a case where the light-transmitting area OA and the light-blocking area LSA are applied to the first area and the second area having different light transmittances from each other, respectively, is exemplified, but the embodiments are not limited thereto. For example, both the first area and the second area may be light-transmitting areas through which incident light is transmitted by 50% or more, but a case where the transmittance of the second area is lower than that of the first area by 10% or less is exemplified.

The light-transmitting area OA may be divided into a plurality of unit light-transmitting areas OAn by the light-blocking area LSA. Each of the unit light-transmitting areas OAn may have a generally rectangular shape or a generally square shape. The size of each of the unit light-transmitting areas OAn and the interval between the unit light-transmitting areas OAn may be substantially uniform.

The unit light-transmitting areas OAn may be spaced apart from each other with the light-blocking area LSA interposed therebetween. The light-blocking area LSA may surround each of the unit light-transmitting areas OAn in a plan view. Moreover, the light-blocking area LSA may have a lattice shape integrally connected between the plurality of unit light-transmitting areas OAn. Details of the light-transmitting area OA and the light-blocking area LSA will be described below.

One side of the flexible film 430 may be disposed on the fingerprint sensor substrate FSUB that is not covered by the light sensing layer 410. The flexible film 430 may be attached to one end of the fingerprint sensor substrate FSUB by using an anisotropic conductive film or ultrasonic bonding. The flexible film 430 may be electrically connected to a fingerprint pad of the fingerprint sensor substrate FSUB. The flexible film 430 may be a flexible printed circuit board, a printed circuit board, or a flexible film such as a chip on film.

The other side of the flexible film 430 may be disposed on the sensor circuit board 440. The other side of the flexible film 430 may be attached to the sensor circuit board 440 through a conductive adhesive member such as an anisotropic conductive film. Thus, the flexible film 430 may be electrically connected to the sensor circuit board 440. Although the embodiments are not limited thereto, the flexible film 430 may be connected to the sensor circuit board 440 in the form of a chip on film. The sensor circuit board 440 may be a flexible printed circuit board or a printed circuit board.

The sensor driving circuit 450 may be disposed on the sensor circuit board 440. However, the embodiments are not limited thereto, and for example, the sensor driving circuit 450 may be disposed on the flexible film 430. The sensor driving circuit 450 may receive sensing voltages of the sensor pixels SP of the light sensing layer 410 through the flexible film 430 and the sensor circuit board 440. Accordingly, the sensor driving circuit 450 may recognize the fingerprint pattern of a finger F shown in FIG. 3 according to the sensing voltages of each of the sensor pixels SP.

Figure 3:
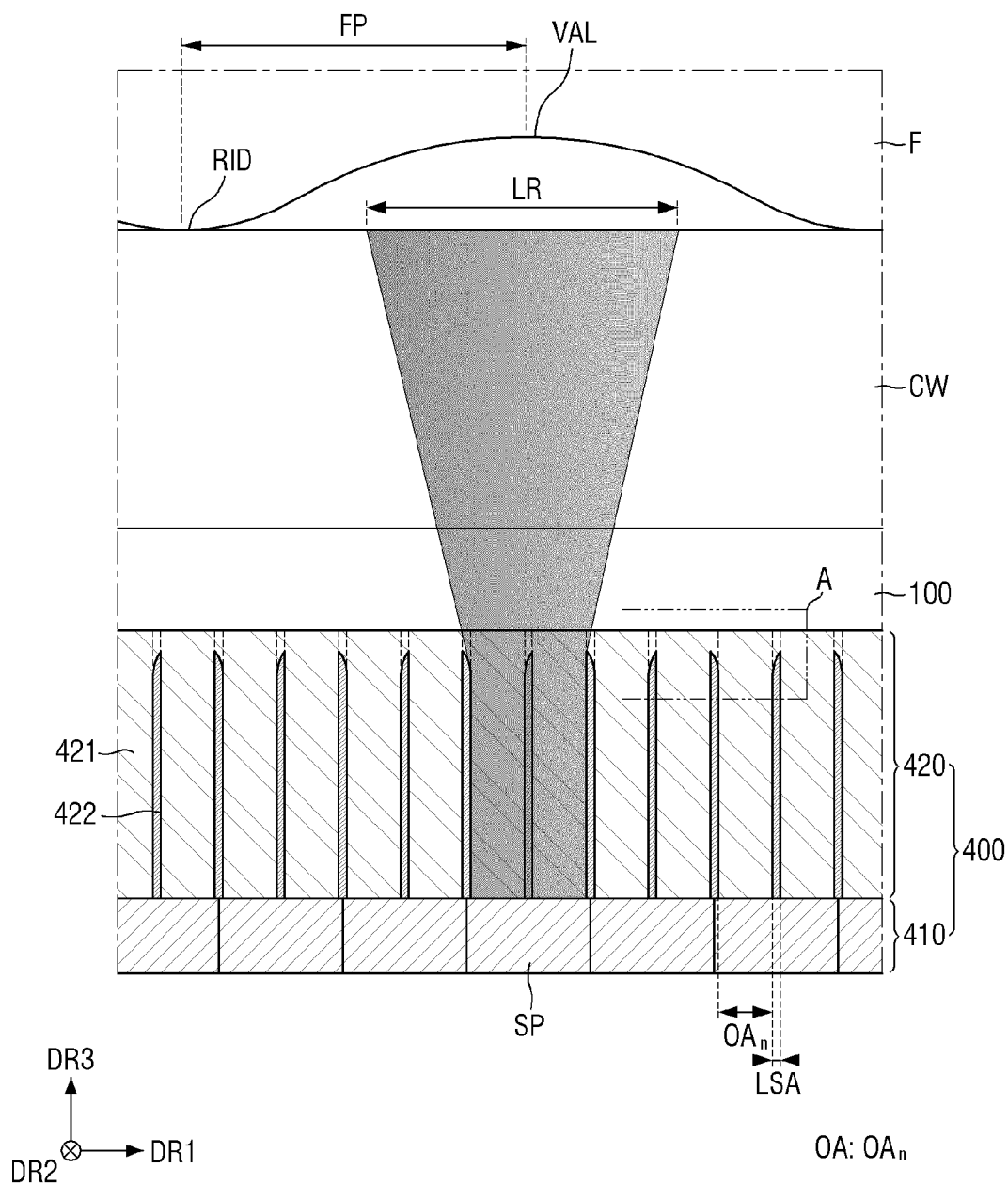
FIG. 3 is a partial, cross-sectional view of the display device of FIG. 1, including the display panel and the fingerprint sensor.

FIG. 3 is a partial, cross-sectional view of the display device of FIG. 1, including the display panel and the fingerprint sensor. FIG. 3 illustrates that a user touches his/her finger F on the display device 10 for fingerprint recognition.

Referring to FIG. 3, the display device 10 may further include a cover window CW disposed on the upper surface of the display panel 100. The cover window CW may be disposed on the display panel 100 to cover the upper surface of the display panel 100. The cover window CW may serve to protect the display panel 100 and lower members. The cover window CW may be attached to the upper surface of the display panel 100 using a transparent adhesive member.

The cover window CW may be made of a transparent material, and may be glass or plastic. For example, when the cover window CW is glass, it may be an ultra thin glass (UTG) having a thickness of 0.1 mm or less. When the cover window CW is made of plastic, it may include a transparent polyimide film.

Each of the sensor pixels SP of the light sensing layer 410 may overlap at least one unit light-transmitting area OAn in the thickness direction (e.g., third direction DR3). While the illustrated embodiment shown in FIG. 3, shows that one sensor pixel SP overlaps two unit light-transmitting areas OAn in the thickness direction, the number of unit light-transmitting areas OAn overlapping the sensor pixel SP in the thickness direction is not limited thereto. For example, the number of unit light-transmitting areas OA overlapping one sensor pixel SP may be in the range of 100 to 1000, or may be in the range of 10 to 10000. Alternatively, the sensor pixel SP may overlap one unit light-transmitting area OAn in the thickness direction.

The fingerprint of the finger F may be shaped by relatively protruding ridge RID and valleys VAL depressed therefrom. When the finger F touches the cover window CW, the ridge RID of the fingerprint directly contacts the cover window CW, and the valley VAL may be spaced from the cover window CW by a predetermined distance. Light traveling toward the finger F may be reflected from each of the ridge RID and valley VAL of the finger F to be directed toward the light sensing layer 410. The light traveling toward the finger F may be light emitted from the display panel 100, but is not limited thereto.

In this case, the light reflected from the ridge RID and valley VAL of the finger F may have different optical characteristics from each other. For example, the light reflected from the ridge RID and the light reflected from the valley VAL may have different frequencies, wavelengths, and intensities from each other. Accordingly, each sensor pixel SP of the light sensing layer 410 may output sensing signals having different electrical characteristics corresponding to the optical characteristics of light reflected from each of the ridge RID and the valley VAL. The sensing signals output by each sensor pixel SP may be converted into image data, and thus a user's fingerprint may be identified.

The light-transmitting area OA of the optical layer 420 may be a path through which light reflected from the ridge RID and valley VAL of the finger F is incident. Specifically, when the user's finger F is in contact with the cover window CW, the light reflected from the finger F may be incident on the sensor pixel SP of the sensing layer 410 through the display panel 100 and the light-transmitting area OA of the optical layer 420.

The light-blocking area LSA of the optical layer 420 may block a part of light incident on the light sensing layer 410. The light-blocking area LSA may control the range of light LR incident on the sensor pixel SP through the light-transmitting area OA. In other words, the light-blocking area LSA may allow the light reflected from the finger F in a specific range of light LR to reach the sensor pixel SP of the light sensing layer 410, and may block the incident light reflected from an area other than the range of light LR.

The range of light LR incident on the sensor pixel SP through the light-transmitting area OA of the optical layer 420 may be shorter than the distance FP between the ridge RID and valley VAL of the fingerprint of the finger F. The distance FP between the ridge RID and valley VAL of the fingerprint of the finger F may be about 500 μm.

Light reflected from the ridge RID and the valley VAL of the finger F may have different light characteristics. For example, light reflected from a ridge RID and light reflected from a valley VAL may have different frequencies, wavelengths, and intensities. Accordingly, each sensor pixel SP of the photo-sensing layer 410 may output a detection signal having different electrical characteristics in response to the optical characteristics of light reflected from each of the ridges RID and valley VAL. Accordingly, the sensor pixel SP may distinguish the light reflected from the ridge RID or valley VAL of the fingerprint of the finger F. The detection signal output by each sensor pixel SP may be converted into image data, and a fingerprint of the user may be identified through this.

Figure 4:
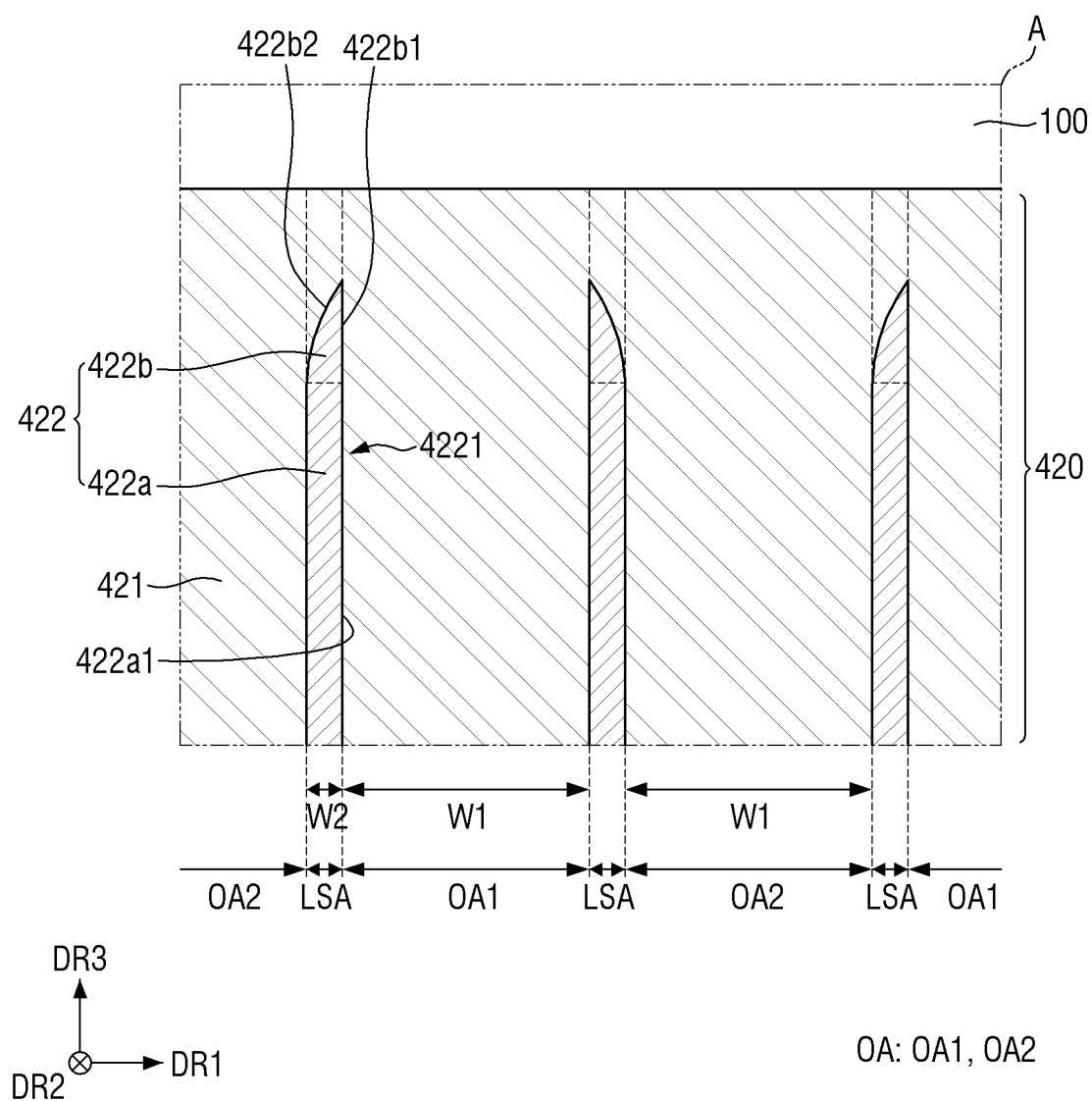
FIG. 4 is an enlarged cross-sectional view of the area A of FIG. 3.

When the fingerprint sensor 400 is disposed under the display panel 100, that is, is disposed in a direction opposite to the direction of light emitted from the display panel 100, the amount of light incident on the optical sensing unit of the fingerprint sensor 400 may be small. Accordingly, the amount of light passing through the optical layer 420 may be increased by increasing the planar area of the light-transmitting area OA of the optical layer 420. Hereinafter, an optical layer 420 according to an embodiment will be described. FIG. 4 describes the optical layer 420 in more detail.

FIG. 4 is an enlarged cross-sectional view of the area A of FIG. 3. FIG. 4 specifically illustrates a fingerprint sensor 400 according to an embodiment.

Referring to FIG. 4, the optical layer 420 may further include a light transmitter, which may be in the form of a light-transmitting member 421, and a light blocker, which may be in the form of a light-blocking member 422. The light-transmitting member 421 may be disposed in the light-transmitting area OA, and the light-blocking member 422 may be disposed in the light-blocking area LSA. The light-transmitting member 421 may be disposed not only in the light-transmitting area OA but also in the light-blocking area LSA. The light-transmitting member 421 may be disposed on the light-blocking member 422 in the light-blocking area LSA. The light-transmitting member 421 may be disposed over the light-blocking member 422 in the light-blocking area LSA, and may overlap the light-blocking member 422.

That is, the light-transmitting member 421 may cover the light-blocking member 422 in the light-blocking area LSA. The light-transmitting member 421 may cover both the side surface of the light-blocking member 422 and the upper surface of the light-blocking member 422. The light-transmitting member 421 is disposed between the light-blocking members 422, and the portions of the light-transmitting member 421 disposed between the light-blocking members 422 may be connected to each other by the portion of the light-transmitting member 421 disposed over the light-blocking member 422.

The light-transmitting member 421 and the light-blocking member 422 may be disposed on the light sensing layer 410. The light-transmitting member 421 and the light-blocking member 422 may be directly disposed on the light sensing layer 410. However, the embodiments are not limited thereto, and the optical layer 420 may further include a base substrate, and in this case, the light-transmitting member 421 and the light-blocking member 422 may be disposed on the base substrate. The base substrate provided thereon with the light-transmitting member 421 and the light-blocking member 422 may be disposed on the light sensing layer 410, and an adhesive member (pressure sensitive adhesive (PSA)) may be disposed between both components to combine the both components.

The light-transmitting member 421 may include a light-transmitting material having high light transmittance. For example, the light-transmitting material may include at least one of acrylic resin, epoxy resin, phenolic resin, polyamide resin, and polyimide resin, but the embodiments are not limited thereto.

The light-blocking member 422 may include a light blocking material having high optical density. The light blocking material may include, for example, but not limited to, a metal having low light transmittance. The metal may include, for example, titanium (Ti), but the embodiments are not limited thereto. The light-blocking member 422 may include an inorganic material that is not transparent.

The light-blocking member 422 may include a base portion 422a and a tip portion 422b connected to the base portion 422a. The base portion 422a may be connected to the light sensing layer 410 under the optical layer 420. Alternatively, when the optical layer 420 includes the base substrate, it may be connected to the base substrate. The base portion 422a may have a substantially constant width (width in the first direction DR1 in the drawing).

The tip portion 422b may be connected to the base portion 422a, and may have a width (width in the first direction DR1 in the drawing) smaller than the width of the base portion 422a. The width of the tip portion 422b may decrease toward the upper end thereof. One side surface 422b1 of the tip portion 422b and one side surface 422a1 of the base portion 422a may be aligned with each other. The other side surface 422b2 of the tip portion 422b may have a generally round shape in a cross-sectional view. Referring to FIG. 4, the other side surface 422b2 of the tip portion 422b has an outwardly convex shape, but the shape thereof is not limited thereto. For example, the other side surface of the tip portion 422b may extend in a direction inclined in the first direction DR1 and the third direction DR3 in a cross-sectional view, or may have a concave shape toward the inside of the light-blocking member 422.

In this case, the other side surface 422b2 of the tip portion 422b, having a round shape, may face the light-blocking member 422 adjacent in the first direction DR1 in a cross-sectional view. In addition, one side surface 4221 of the light-blocking member 422 having one side surface 422b1 of the tip portion 422b and one side surface 422a1 of the base portion 422a aligned with each other may face the light-blocking member 422 adjacent in the first direction DR1 in a cross-sectional view.

In order to describe this structure in more detail, further reference will be made to FIG. 5.

Figure 5:
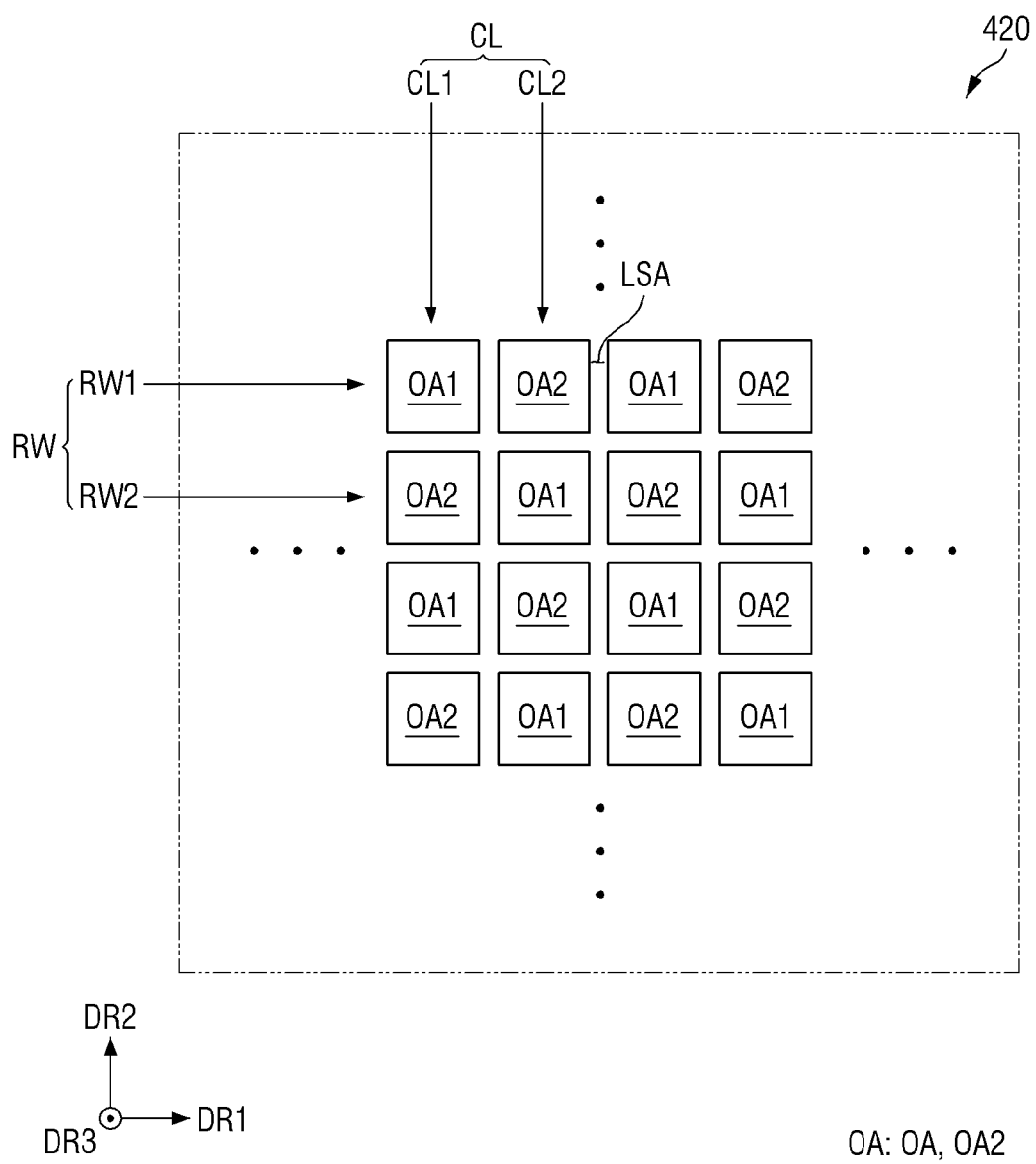
FIG. 5 is a partial, plan view of the optical layer included in the fingerprint sensor of FIG. 2.

FIG. 5 is a partial, plan view of the optical layer included in the fingerprint sensor of FIG. 2.

Referring to FIG. 5, the light-transmitting area OA may include a first unit light-transmitting area OA1 and a second unit light-transmitting area OA2. Each of the first unit light-transmitting area OA1 and the second unit light-transmitting area OA2 may be at least one of the unit light-transmitting areas OAn. Referring to FIG. 4, the first unit light-transmitting area OA1 may be disposed between one side surface 4221 of the light-blocking member 422 including one side surface 422b1 of the tip portion 422b and one side surface 422a1 of the base portion 422a facing each other and aligned with each other, and the second unit light-transmitting area OA2 may be disposed between the other side surfaces of the light-blocking member 422 including the other side surfaces 422b2 of the tip portion 422b facing each other and having a generally round sound.

As the shapes of one side 422b1 and the other side 422b2 of the tip portion 422b in the cross-sectional view are different from each other, even when the widths W1 of the first unit light-transmitting area OA1 and the second unit light-transmitting area OA2 are the same as each other, the amount of light incident on the first unit light-transmitting area OA1 and the amount of light incident on the second unit light-transmitting area OA2 may be different from each other. Accordingly, in the identification of a user's fingerprint, sensing signals output from the sensor pixel SP may be converted into image data. Alternatively, in an embodiment shown in FIG. 4, although it is exemplified that the widths W1 of the first unit light-transmitting area OA1 and the second unit light-transmitting area OA2 are substantially the same as each other, the embodiments are not limited thereto, and the width W1 of the first unit light-transmitting area OA1 may be different from the width W1 of the second unit light-transmitting area OA2 in consideration of the amount of light incident on the first unit light-transmitting area OA1 and the second unit light-transmitting area OA2.

For example, the amount of light incident on the second unit light-transmitting area OA2 disposed between the other side surfaces of the light-blocking member 422 including the other side surface 422b2 of the round-shaped tip portion 422b may be greater than the amount of light incident on the first unit light-transmitting area OA1. In this case, sensing signals output from each sensor pixel SP may be converted into image data in consideration of the number of first unit light-transmitting areas OA1 and the number of second unit light-transmitting areas OA2 corresponding to each sensor pixel SP. Alternatively, the width of the first unit light-transmitting area OA1 may be larger than the width of the second unit light-transmitting area OA2 in the cross-sectional view.

Referring to FIG. 5, the first unit light-transmitting areas OA1 and the second unit light-transmitting areas OA2 may be repetitively arranged, for example they may be arranged in a matrix shape. The length direction of the rows may be substantially the same as the first direction DR1, and the length direction of the columns may be substantially the same as the second direction DR2.

In other words, the unit light-transmitting row RW includes a first unit light-transmitting row RW1 and a second unit light-transmitting row RW2 each including first unit light-transmitting areas OA1 and second unit light-transmitting areas OA2 that are alternately arranged along the first direction DR1. The first unit light-transmitting rows RW1 and the second unit light-transmitting rows RW2 may be repetitively arranged along the second direction DR2. Further, the unit light-transmitting column CL includes a first unit light-transmitting column CL1 and a second unit light-transmitting column CL2 each including first unit light-transmitting areas OA1 and second unit light-transmitting areas OA2 that are alternately arranged along the second direction DR2. The first unit light-transmitting columns CL1 and the second unit light-transmitting columns CL2 may be repetitively arranged along the first direction DR1.

Referring to FIG. 4, the width W1 of the unit light-transmitting area OAn is not limited, but, for example, may be in any one of the range of about 1 μm to 3 μm, the range of about 1 μm to 5 μm, the range of about 1 μm to 10 μm, and the range of about 0.1 μm to 10 μm, or may be about 2 μm. That is, in a cross-sectional view, the distance W1 between the light-blocking members 422 adjacent to each other and facing each other with the light-transmitting member 421 therebetween is not limited, but, for example, may be in any one of the range of about 1 μm to 3 μm, the range of about 1 μm to 5 μm, the range of about 1 μm to 10 μm, and the range of about 0.1 μm to 10 μm, or may be about 2 μm.

Referring to FIG. 4 again, the width W2 of the light-blocking area LSA is not limited, but, for example, may be in any one of the range of about 90 nm to 110 nm, the range of about 50 nm to 200 nm, and the range of about 10 nm to 500 nm, or may be about 100 nm. The width W2 of the base portion 422a of the light-blocking member 422 is not limited, but, for example, may be in any one of the range of about 90 nm to 110 nm, the range of about 50 nm to 200 nm, and the range of about 10 nm to 500 nm, or may be about 100 nm. That is, the distance W2 between the light-transmitting members 421 adjacent to each other and facing each other is not limited, but, for example, may be in any one of the range of about 90 nm to 110 nm, the range of about 50 nm to 200 nm, and the range of about 10 nm to 500 nm, or may be about 100 nm.

The width W1 of the unit light-transmitting area OAn may be greater than the width W2 of the light-blocking area LSA. Although the embodiments are not limited thereto, the length of the width W1 of the unit light-transmitting area OAn may be in at least one of the range of about 15 times to 25 times, the range of about 10 times to 30 times, the range of about 5 times to 100 times, and the range of about 5 times to 200 times the length of the width W2 of the light-blocking area LSA, or the length of the width W1 of the unit light-transmitting area OAn may be about 20 times the length of the width W2 of the light-blocking area LSA.

When the size of the width W1 of the unit light-transmitting area OAn, the size of the width W2 of the light-blocking area LSA, and the ratio of the size of the width W1 of the unit light-transmitting area OAn and the size of the width W2 of the light-blocking area LSA are within the above-described ranges, in the traveling path of light, the planar area of the light-transmitting area OA may be larger than the planar area of the light-blocking area LSA. The ratio of the planar area of the light-transmitting area OA and the planar area of the light-blocking area LSA may be substantially the same as the ratio of the size of the width W1 of the unit light-transmitting area OAn and the size of the width W2 of the light-blocking area LSA.

Accordingly, the amount of light passing through the optical layer 420 and reaching the photo-sensing layer 410 may be increased, and the accuracy of fingerprint recognition in the fingerprint sensor 400 may be improved. Although the embodiments are not limited thereto, the average light transmittance over the entire area of the light sensing layer 410 may be more than about 90% or more than about 94%, or about 94.8%. In addition, as the width W2 of the light-blocking area LSA of a certain size is secured, while increasing the planar area of the light-transmitting area OA, light other than the specific range of light LR, reaching one sensor pixel SP, may be blocked, and the accuracy of fingerprint recognition in the fingerprint sensor 400 may further be improved.

Moreover, since the width W2 of the light-blocking member 422 disposed in the light-blocking area LSA is relatively smaller than the width W1 of the light-transmitting member 421 disposed in the light-transmitting area OA, an error in the width W2 of the light-blocking member 422 that may occur during the process of forming the light-blocking member 422 may be negligible. Accordingly, the process for uniformly forming the width W2 of the light-blocking member 422 may be omitted, so that process efficiency may be improved, and reliability of the fingerprint sensor 400 may be improved.

Hereinafter, the light sensing layer 410 will be described in detail with reference to FIGS. 6 and 7.

Figure 6:
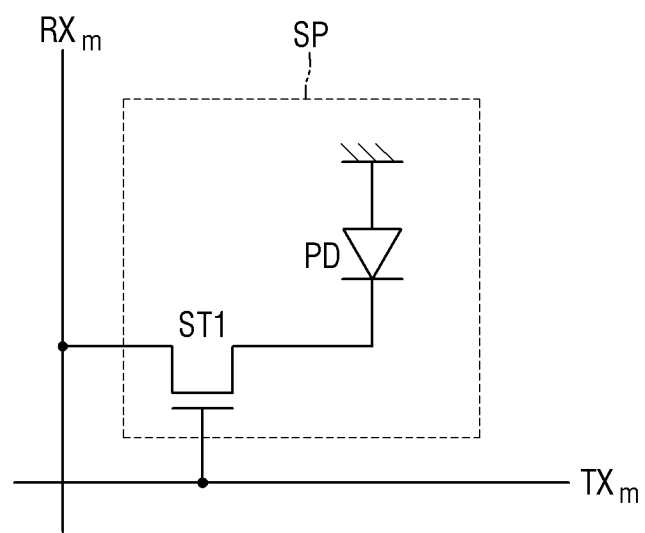
FIG. 6 is an equivalent circuit diagram of an embodiment of a representative sensor pixel included in the light sensing layer of FIG. 3.
Figure 7:
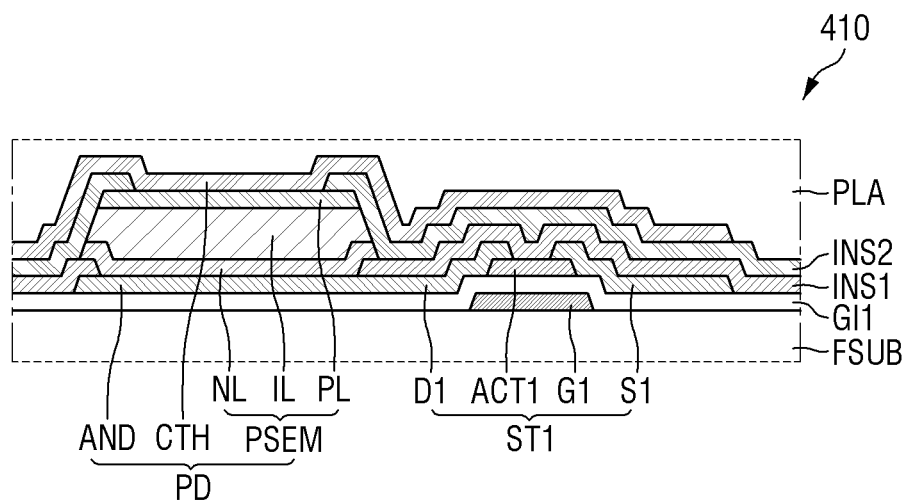
FIG. 7 is a cross-sectional view of an embodiment of the light sensing layer of FIG. 3.

FIG. 6 is an equivalent circuit diagram of an embodiment of a representative sensor pixel included in the light sensing layer of FIG. 3, and FIG. 7 is a cross-sectional view of an embodiment of the light sensing layer of FIG. 3. For convenience of explanation, FIG. 6 illustrates a sensor pixel SP connected to an m-th (m is a natural number) horizontal sensing line Txm and an n-th (n is a natural number) vertical sensing line Rxn. FIG. 7 illustrates a stacked structure of the light sensing layer 410.

First, referring to FIG. 6, the sensor pixel SP of the light sensing layer 410 according to an embodiment may include a first transistor ST1 and a light sensing element PD.

The light sensing element PD may be connected between the ground power and one electrode of the first transistor ST1. The light sensing element PD is configured to convert light energy into electrical energy, and may have photovoltaic power in which a current flow changes depending on the intensity of ambient light.

The first transistor ST1 is connected to the n-th vertical sensing line RXn and the light sensing element PD, and the gate electrode of the first transistor ST1 is connected to the m-th horizontal sensing line TXm. When a driving signal having a gate-on voltage (for example, a low voltage) is supplied to the m-th horizontal sensing line TXm, the first transistor ST1 is turned on. When the first transistor ST1 is turned on, a current flowing through the light sensing element PD may flow to the n-th vertical sensing line RXn.

The display device 10 may apply a driving signal to the horizontal sensing line of the sensor pixel SP, and may detect a fingerprint based on a current (sensing signal) supplied to the vertical sensing line.

Referring to FIG. 7, the light sensing layer 410 according to an embodiment may further include a conductive layer and a plurality of insulating layers.

The first transistor ST1 may be disposed on the fingerprint sensor substrate FSUB. The first transistor ST1 of the light sensing layer 410 may be a thin film transistor. The first transistor ST1 of the light sensing layer 410 includes a first active layer ACT1, a first gate electrode G1, a first source electrode S1, and a first drain electrode D1.

The first gate electrode G1 of the first transistor ST1 may be disposed on the fingerprint sensor substrate FSUB. The first gate electrode G1 may be formed as a single layer or multiple layers including any one of molybdenum (Mo), aluminum (Al), chromium (Cr), gold (Au), titanium (Ti), nickel (Ni), neodymium (Nd), and copper (Cu), or an alloy thereof.

A buffer layer may be further provided on the fingerprint sensor substrate FSUB. The buffer layer may be formed of at least one inorganic layer, and may prevent the penetration of moisture or the like from the lower portion of the light sensing layer 410 to protect the first transistor ST1 and the light sensing element PD.

A first gate insulating layer GI1 may be disposed on the first gate electrode G1. The first gate insulating layer GI1 may be formed of an inorganic layer, for example, a silicon nitride layer, a silicon oxynitride layer, a silicon oxide layer, a titanium oxide layer, or an aluminum oxide layer.

The first active layer ACT1 of the first transistor ST1 may be disposed on the first gate insulating layer GI1. The first active layer ACT1 includes polycrystalline silicon, single crystal silicon, low-temperature polycrystalline silicon, amorphous silicon, or an oxide semiconductor. The first active layer ACT1 may overlap the first gate electrode G1 in the third direction (Z-axis direction) that is a thickness direction of the fingerprint sensor substrate FSUB.

The first source electrode S1 and first drain electrode D1 of the first transistor ST1 may be disposed on the first active layer ACT1. The first source electrode S1 may be disposed on one side of the first active layer ACT1, and the first drain electrode D1 may be disposed on the other side of the first active layer ACT1.

A first insulating layer INS1 may be disposed on the first active layer ACT1, the first source electrode S1, and the first drain electrode D1. The first insulating layer INS1 may be formed of an inorganic layer, for example, a silicon nitride layer, a silicon oxynitride layer, a silicon oxide layer, a titanium oxide layer, or an aluminum oxide layer.

The light sensing element PD may be disposed on the first gate insulating layer GI1. Although it is illustrated in the drawing that the light sensing element PD is a photodiode, the embodiments are not limited thereto, and the light sensing element PD may be formed as a phototransistor. When the light sensing element PD is a photodiode, it may include a second electrode CTH, a semiconductor layer PSEM, and a first electrode AND. In this case, the second electrode CTH of the light sensing element PD may be a common electrode disposed over the plurality of sensor pixels SP, and the first electrode AND thereof may be a pixel electrode disposed on each sensor pixel SP.

The first electrode AND may be disposed on the first gate insulating layer GI1. The first electrode AND may be electrically connected to the first drain electrode D1 of the first transistor ST1. The first electrode AND may be formed as a single layer of molybdenum (Mo), titanium (Ti), copper (Cu), or aluminum (Al), or may be formed as a laminated structure (Ti/Al/Ti) of aluminum and titanium, a laminated structure (ITO/Al/ITO) of aluminum and ITO, an APC alloy, or a laminated structure (ITO/APC/ITO) of an APC alloy and ITO.

A semiconductor layer PSEM in which an N-type semiconductor layer NL, an I-type semiconductor layer IL, and a P-type semiconductor layer PL are sequentially laminated may be disposed on the first electrode AND. When the semiconductor layer PSEM is formed in a PIN structure, the I-type semiconductor layer IL is depleted by the P-type semiconductor layer PL and the N-type semiconductor layer NL to generate an electric field therein, and holes and electrons generated by sunlight are drifted by the electric field. Thus, holes may be collected into the second electrode CTH through the P-type semiconductor layer PL, and electrons may be collected into the first electrode AND through the N-type semiconductor layer NL.

The P-type semiconductor layer PL may be disposed close to a surface on which external light is incident, and the N-type semiconductor layer NL may be disposed far away from a surface on which external light is incident. Since the drift mobility of holes is lower than the drift mobility of electrons, the P-type semiconductor layer PL may be formed close to the incident surface of external light, thereby maximizing the collection efficiency by incident light.

The N-type semiconductor layer NL may be disposed on the first electrode AND, the I-type semiconductor layer IL may be disposed on the N-type semiconductor layer NL, and the P-type semiconductor layer PL may be disposed on the I-type semiconductor layer IL. In this case, the P-type semiconductor layer PL may be formed by doping amorphous silicon (a-Si:H) with a P-type dopant. The I-type semiconductor layer IL may be made of amorphous silicon germanium (a-SiGe:H) or amorphous silicon carbide (a-SiC:H). The N-type semiconductor layer NL may be formed by doping amorphous silicon germanium (a-SiGe:H) or amorphous silicon carbide (a-SiC:H) with an N-type dopant.

Alternatively, the N-type semiconductor layer NL may be disposed on the first electrode AND, the I-type semiconductor layer IL may be omitted, and the P-type semiconductor layer PL may be disposed on the N-type semiconductor layer NL.

The second electrode CTH may be disposed on the P-type semiconductor layer PL. The second electrode CTH may be formed of a transparent conductive material such as indium tin oxide (ITO) and indium zinc oxide (IZO) capable of transmitting light.

A planarization layer PLA may be disposed on the second electrode CTH. The planarization layer PLA may planarize an upper surface despite a lower step. The planarization layer PLA may be formed of an organic layer including acrylic resin, epoxy resin, phenolic resin, polyamide resin, or polyimide resin.

The optical layer 420 may be disposed on the planarization layer PLA. Since the optical layer 420 has already been described, a description thereof will be omitted.

Hereinafter, a display panel 100 according to an embodiment will be described with reference to FIG. 8.

Figure 8:
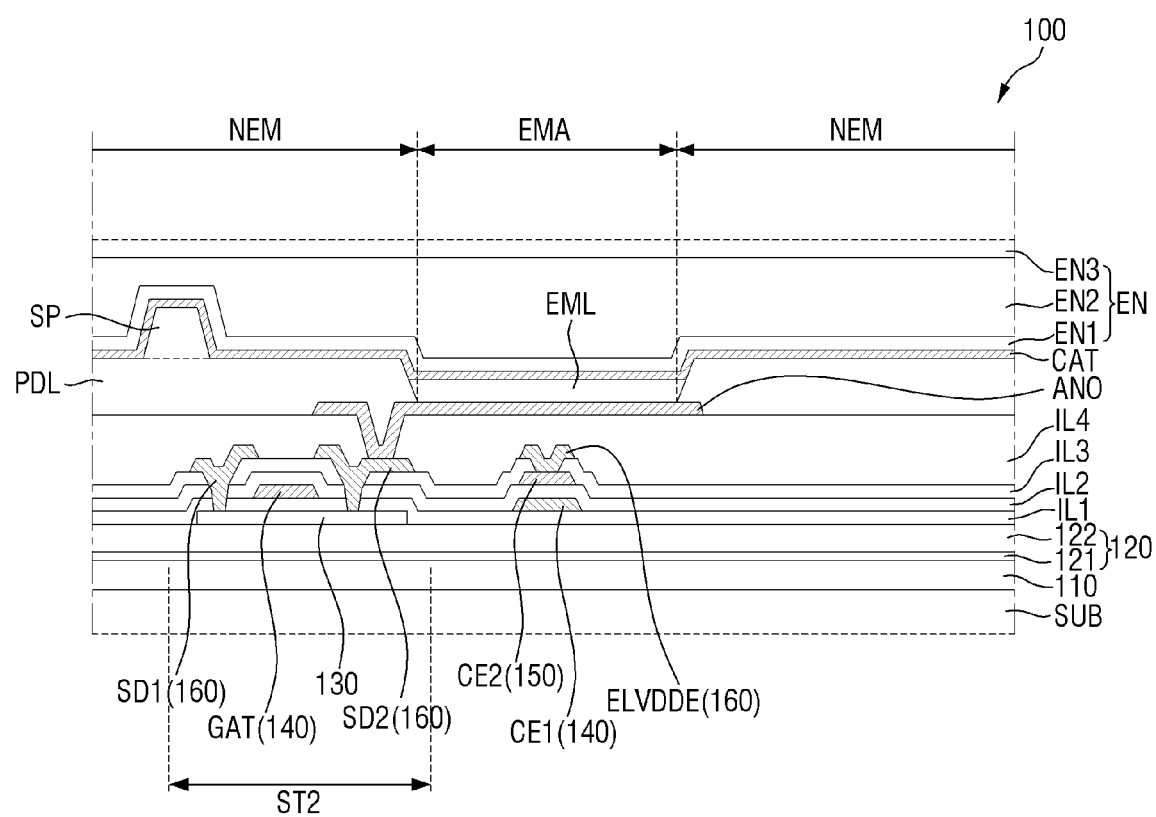
FIG. 8 is a cross-sectional view of an embodiment of the display panel of FIG. 1.

FIG. 8 is a cross-sectional view of an embodiment of the display panel of FIG. 1.

Referring to FIG. 8, the display panel 100 includes a plurality of pixels, and each of the pixels may include at least one thin film transistor (a second transistor ST2). The display panel 100 may include a display base substrate SUB, a barrier layer 110, a buffer layer 120, a semiconductor layer 130, a first insulating layer ILL a first gate conductive layer 140, a second insulating layer IL2, a second gate conductive layer 150, a third insulating layer IL3, a data conductive layer 160, a fourth insulating layer IL4, an anode electrode ANO, a pixel defining layer PDL including an opening exposing the anode electrode ANO, a light-emitting layer EML disposed in the opening of the pixel defining layer PDL, a cathode electrode CAT disposed on the light-emitting layer EML and the pixel defining layer PDL, and a thin film encapsulation layer EN disposed on the cathode electrode CAT. Each of the above-described layers may be formed as a single layer, but may be formed as a laminated layer including a plurality of layers. Another layer may be further disposed between the respective layers.

The display base substrate SUB supports the respective layers disposed thereon. The display base substrate SUB may be made of an insulating material such as a polymer resin, or may be made of an inorganic material such as glass or quartz. However, the embodiments are not limited thereto, and the display base substrate SUB may be a transparent plate or a transparent film.

The display base substrate SUB may be a flexible substrate capable of bending, folding, rolling, or the like, but is not limited thereto, and the display base substrate SUB may be a rigid substrate.

The barrier layer 110 is disposed on the display base substrate SUB. The barrier layer 110 may prevent the diffusion of impurity ions, prevent the penetration of moisture or external air, and perform a surface planarization function. The barrier layer 110 may include at least one of silicon oxide (SiOx), silicon nitride (SiNx), or silicon oxynitride (SiOxNy). However, the embodiments are not limited thereto, and the barrier layer 110 may be omitted depending on the type or process conditions of the display base substrate SUB.

The buffer layer 120 is disposed on the barrier layer 110. The buffer layer 120 may include silicon nitride (SiNx), silicon oxide (SiOx), or silicon oxynitride (SiOxNy).

The semiconductor layer 130 is disposed on the buffer layer 120. The semiconductor layer 130 forms a channel of the second transistor ST2 of the pixel ("PX" in FIG. 3). The semiconductor layer 130 may include polycrystalline silicon. However, the embodiments are not limited thereto, and the semiconductor layer 130 may include at least one of single crystal silicon, low-temperature polycrystalline silicon, amorphous silicon, and an oxide semiconductor.

The first insulating layer IL1 is disposed on the semiconductor layer 130. The first insulating layer IL1 may be a first gate insulating layer having a gate insulating function. The first insulating layer IL1 may include at least one of a silicon compound and a metal oxide.

The first gate conductive layer 140 is disposed on the first insulating layer IL1. The first gate conductive layer 140 may include a gate electrode GAT of the second transistor ST2 of the pixel, a scan line connected thereto, and a storage capacitor first electrode CE1.

The first gate conductive layer 140 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ti), chromium (Cr), calcium (Ca), titanium (Ti), tantalum (Ta), tungsten (W), and copper (Cu).

The second insulating layer IL2 may be disposed on the first gate conductive layer 140. The second insulating layer IL2 may be an interlayer insulating layer or a second gate insulating layer. The second insulating layer IL2 may include an inorganic insulating material such as silicon oxide, silicon nitride, silicon oxynitride, hafnium oxide, aluminum oxide, titanium oxide, tantalum oxide, or zinc oxide.

The second gate conductive layer 150 is disposed on the second insulating layer IL2. The second gate conductive layer 150 may include a storage capacitor second electrode CE2. The second gate conductive layer 150 may include at least one metal selected from molybdenum (Mo), aluminum (Al), platinum (Pt), palladium (Pd), silver (Ag), magnesium (Mg), gold (Au), nickel (Ni), neodymium (Nd), iridium (Ti), chromium (Cr), calcium (Ca), titanium (Ti), tantalum (Ta), tungsten (W), and copper (Cu). The second gate conductive layer 150 may be made of the same material as the first gate conductive layer 140, but is not limited thereto.

The third insulating layer IL3 is disposed on the second gate conductive layer 150. The third insulating layer IL3 may be an interlayer insulating layer. The third insulating layer IL3 may include an inorganic insulating material such as silicon oxide, silicon nitride, silicon oxynitride, hafnium oxide, aluminum oxide, titanium oxide, tantalum oxide, or zinc oxide.

The data conductive layer 160 is disposed on the third insulating layer IL3. The data conductive layer 160 may include a first electrode SD1 and a second electrode SD2 of the second transistor ST2 of one pixel of the display panel, and a first power voltage electrode ELVDDE. The first electrode SD1 and second electrode SD2 of the second transistor ST2 may be electrically connected to a source region and a drain region of the semiconductor layer 130 through a contact hole penetrating the third insulating layer IL3, the second insulating layer IL2, and the first insulating layer IL1. The first power voltage electrode ELVDDE may be electrically connected to the storage capacitor second electrode CE2 through a contact hole penetrating the third insulating layer IL3.

The data conductive layer 160 may include at least one metal selected from aluminum (Al), molybdenum (Mo), platinum (Pt), palladium (Pd), silver (Ag), magnesium (Mg), gold (Au), nickel (Ni), neodymium (Nd), iridium (Ti), chromium (Cr), calcium (Ca), titanium (Ti), tantalum (Ta), tungsten (W), and copper (Cu). The data conductive layer 160 may be a single layer or multiple layers. For example, the data conductive layer 160 may be formed as a laminated structure of Ti/Al/Ti, Mo/Al/Mo, Mo/AlGe/Mo, or Ti/Cu.

The fourth insulating layer IL4 is disposed on the data conductive layer 160. The fourth insulating layer IL4 covers the data conductive layer 160. The fourth insulating layer IL4 may be a via layer. The fourth insulating layer IL4 may include an organic insulating material. When the fourth insulating layer IL4 includes an organic material, the upper surface thereof may be substantially flat despite a lower step.

The anode electrode ANO is disposed on the fourth insulating layer IL4. The anode electrode ANO may be a pixel electrode provided for each pixel. The anode electrode ANO may be connected to the second electrode SD2 of the second transistor ST2 through a contact hole penetrating the fourth insulating layer IL4. The anode electrode 160 may at least partially overlap the light-emitting area EMA of the pixel.

The anode electrode ANO may have, but is not limited to, a laminated film structure in which a high-work-function material layer including Indium-Tin-Oxide (ITO), Indium-Zinc-Oxide (IZO), Zinc Oxide (ZnO), or Indium Oxide ($In_2O_3$), and a reflective material layer including silver (Ag), magnesium (Mg), aluminum (Al), platinum (Pt), lead (Pd), gold (Au), nickel (Ni), neodymium (Nd), iridium (Ir), chromium (Cr), lithium (Li), calcium (Ca), or a mixture thereof are laminated. The high-work-function material layer may be disposed above the reflective material layer, and may thus be disposed closer to the light-emitting layer EML. The anode electrode ANO may have a multilayer structure of ITO/Mg, ITO/MgF, ITO/Ag, or ITO/Ag/ITO, but is not limited thereto.

The pixel defining layer PDL may be disposed on the anode electrode ANO. The pixel defining layer PDL may be disposed on the anode electrode ANO, and may include an opening exposing the anode electrode ANO. The light-emitting area EMA and the non-light-emitting area NEM may be divided by the pixel defining layer PDL and the opening thereof. The pixel defining layer PDL may include an organic insulating material. However, the embodiments are not limited thereto, and the pixel defining layer PDL may include an inorganic material.

A spacer SP may be disposed on the pixel defining layer PDL. The spacer SP may serve to maintain a gap with a structure disposed thereon. Like the pixel definition layer PDL, the spacer SP may include an organic insulating material.

The light-emitting layer EML is disposed on the anode electrode ANO exposed by the pixel defining layer PDL. The light-emitting layer EML may include an organic material layer. The organic material layer of the light-emitting layer includes an organic light-emitting layer, and may further include a hole injection/transport layer and/or an electron injection/transport layer.

The cathode electrode CAT may be disposed on the light-emitting layer EML. The cathode electrode CAT may be a common electrode entirely disposed over pixels without distinction of the pixels. The anode electrode ANO, the light-emitting layer EML, and the cathode electrode CAT may each constitute an organic light-emitting element.

The cathode electrode CAT may include a low-work-function material layer including Li, Ca, LiF/Ca, LiF/Al, Al, Mg, Ag, Pt, Pd, Ni, Au Nd, Ir, Cr, BaF, Ba, or a compound or mixture thereof (for example, a mixture of Ag and Mg). The cathode electrode CAT may further include a transparent metal oxide layer disposed on the low-work-function material layer.

A thin film encapsulation layer EN including a first inorganic layer EN1, a first organic layer EN2, and a second inorganic layer EN3 is disposed on the cathode electrode CAT. At an end of the thin film encapsulation layer EN, the first inorganic layer EN1 and the second inorganic layer EN3 may contact each other. The first organic layer EN2 may be sealed by the first inorganic layer EN1 and the second inorganic layer EN3.

Each of the first inorganic layer EN1 and the second inorganic layer EN3 may include silicon nitride, silicon oxide, or silicon oxynitride. The first organic layer EN2 may include an organic insulating material.

Hereinafter, a method of manufacturing the display device 10 according to an embodiment will be described.

FIGS. 9 to 14 are cross-sectional views of various processing steps in an embodiment of a method for manufacturing a display device according the principles of the invention. Specifically, FIGS. 9 to 14 are cross-sectional views for each manufacturing process illustrating an optical layer 420 of the fingerprint sensor 400 of the display device 10.

Figure 9:
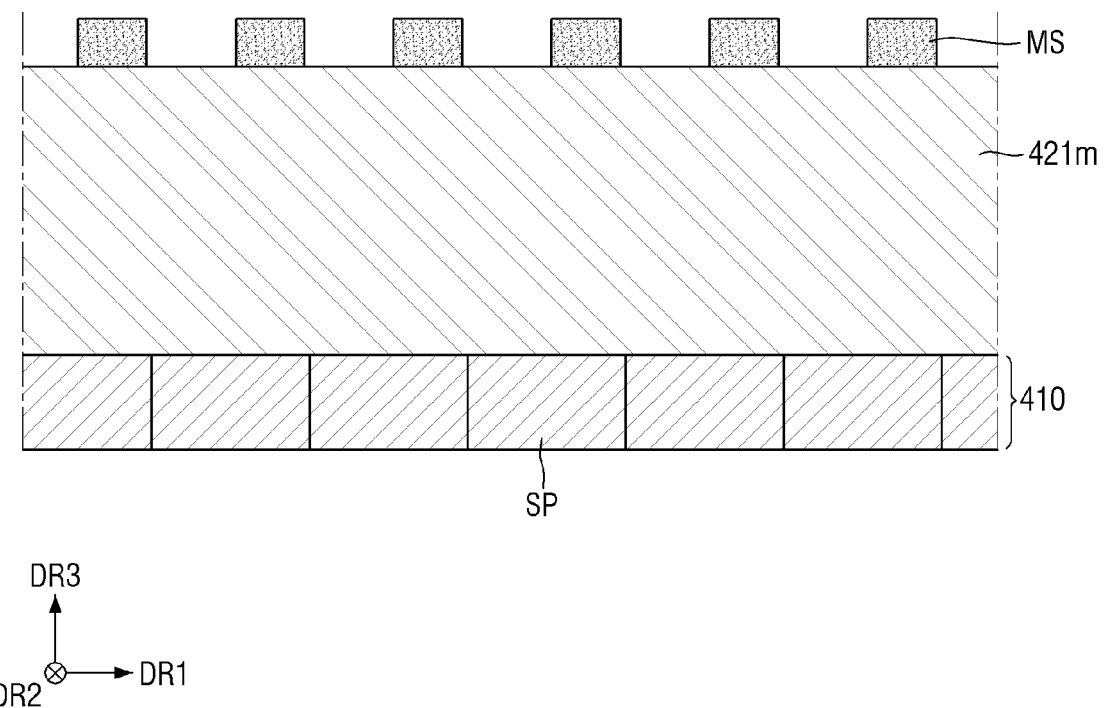
FIGS. 9 to 14 are cross-sectional views of various processing steps in an embodiment of a method for manufacturing a display device according to the principles of the invention.

Referring to FIG. 9, a first light-transmitting member material layer 421m is formed on the entire area of the light sensing layer 410, and a mask pattern MS is formed on the first light-transmitting member material layer 421m.

Specifically, a first light-transmitting member material layer 421m may be formed on the light sensing layer 410. The first light-transmitting member material layer 421m may be formed over the entire area of the light sensing layer 410. The first light-transmitting member material layer 421m may include an organic material, and the organic material may include substantially the same material as the aforementioned light-transmitting member 421.

Thereafter, a mask pattern MS is patterned on the first light-transmitting member material layer 421m. The mask pattern MS may include at least one of a transparent conductive oxide (TCO) and an inorganic layer. Although not limited thereto, for example, the transparent conductive oxide (TCO) may include at least one of indium tin oxide (ITO) and indium zinc oxide (IZO), and the inorganic layer includes aluminum (Al) or the like.

Figure 10:
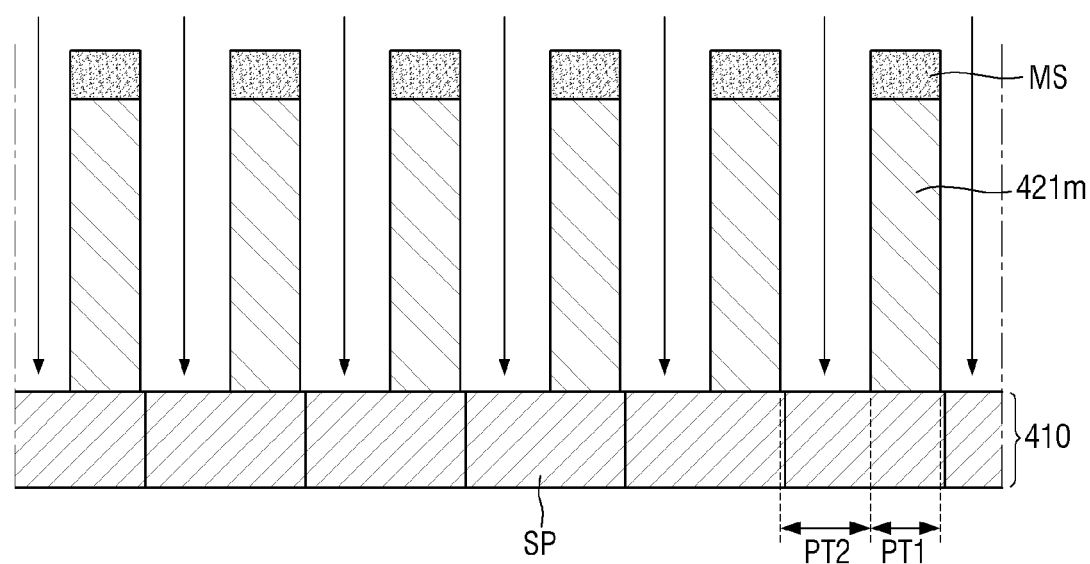

Next, referring to FIG. 10, the first light-transmitting member material layer 421m is patterned using the mask pattern MS.

Specifically, the first light-transmitting member material layer 421m may be patterned by etching the first light-transmitting member material layer 421m using the mask pattern MS as an etching mask. The process of etching the first light-transmitting member material layer 421m may be performed by dry etching, but the embodiments are not limited thereto, and the process thereof may also be performed by wet etching.

A part of the first light-transmitting member material layer 421m in a portion not covered by the mask pattern MS may be removed, and only a portion covered by the mask pattern MS may remain. Thus, the first light-transmitting member material layer 421m may remain in the only area, and a part of the light sensing layer 410 may be exposed. That is, as first light-transmitting member material layer 421m is patterned, a remaining portion PT1 in which the first light-transmitting member material layer 421m is disposed may be formed, and as the first light-transmitting member material layer 421m is removed, an exposed portion PT2 exposing the light sensing layer 410 may be formed.

The remaining portion PT1 may form a part of the light-transmitting area OA of FIG. 3. Further, the first light-transmitting member material layer 421m, disposed in the remaining portion PT1, may form a part of the light-transmitting member 421 of FIG. 3.

Figure 11:
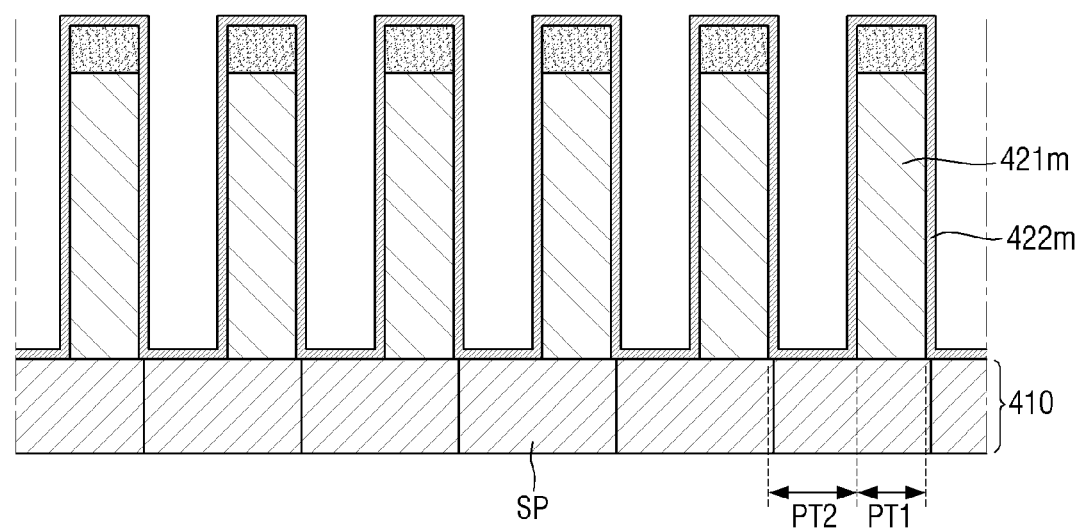
Figure 11:
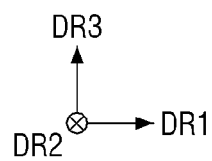

Next, referring to FIG. 11, a light-blocking member material layer 422m is formed over the entire area of the light sensing layer 140 on which the first light-transmitting member material layer 421m is disposed.

Specifically, a light-blocking member material layer 422m is formed on the light sensing layer 410 on which the first light-transmitting member material layer 421m is disposed. The light-blocking member material layer 422m may include substantially the same material as the light-blocking member 422 of FIG. 3.

The light-blocking member material layer 422m may be disposed on the remaining portion PT1 and the exposed portion PT2. The light-blocking member material layer 422m may cover the first light-transmitting member material layer 421m and the mask pattern MS in the above area. In other words, the light-blocking member material layer 422m may be disposed on the side surface of the first light-transmitting member material layer 421m in the remaining portion PT1 and on the upper and side surfaces of the mask pattern MS to cover the side surface of the first light-transmitting member material layer 421m and the upper and side surfaces of the mask pattern MS. Further, the light-blocking member material layer 422m may be disposed on one surface (upper surface) of the light sensing layer 410 exposed in the exposed portion PT2 to cover the light sensing layer 410 in the above area.

The thickness of the light-blocking member material layer 422m may be substantially the same as the width W2 of the light-blocking area LSA of FIG. 4. The thickness of the light-blocking member material layer 422m includes the width of the light-blocking member material layer 422m disposed on the side surface of the first light-transmitting member material layer 421m in the first direction DR1 and the width of the light-blocking member material layer 422m disposed on the upper surfaces of the mask pattern MS and the light sensing layer 410 in the thickness direction (e.g., third direction DR3).

The light-blocking member material layer 422m may be formed by atomic layer deposition (ALD). In this case, the light-blocking member material layer 422m may have excellent step coverage, and thus may be formed without interruption in the middle regardless of the thickness of the first light-transmitting member material layer 421m. However, the method of forming the light-blocking member material layer 422m is not limited thereto, and may be formed by, for example, a chemical vapor deposition (CVD) process or a sputtering process.

Figure 12:
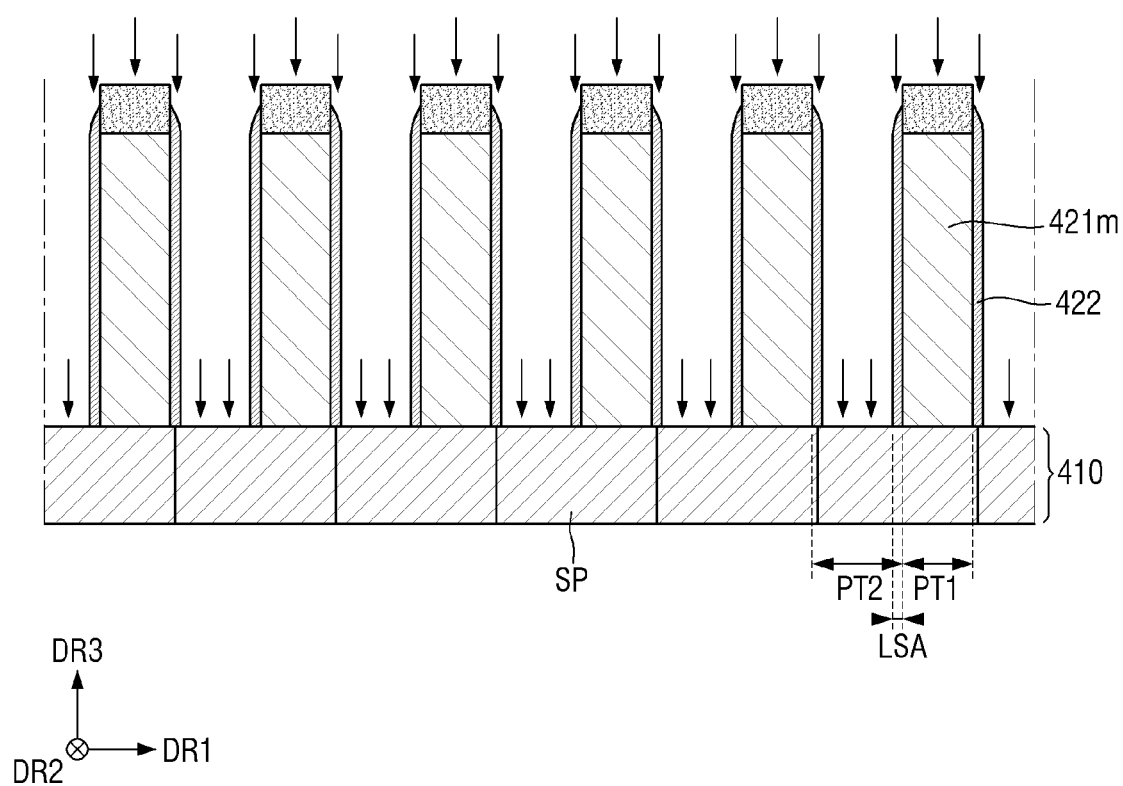

Next, referring to FIG. 12, the light-blocking member material layer 422m is etched to pattern the light-blocking member 422.

Specifically, the light-blocking member material layer 422m may be etched, thereby patterning the light-blocking member 422. The process of etching the light-blocking member material layer 422m may be performed by dry etching, but is not limited thereto, and may be performed by wet etching or the like. When the process of etching the light-blocking member material layer 422m may be performed by dry etching, a separate etching mask may be unnecessary.

As the light-blocking member material layer 422m is etched, the light-blocking member material layer 422m covering the upper surface of the mask pattern MS and the upper surface of the light sensing layer 410 may be removed. The light-blocking member material layer 422m covering the side surfaces of the first light-transmitting member material layer 421m and the mask pattern MS may remain without being removed. Accordingly, as shown in FIG. 12, the light-blocking member 422 and the light-blocking area LSA provided with the light-blocking member 422 may be formed.

Further, in the process of etching the light-blocking member material layer 422m covering the upper surface of the mask pattern MS and the upper surface of the light sensing layer 410, the upper portion of the light-blocking member material layer 422m covering the side surfaces of the first light-transmitting member material layer 421m and the mask pattern MS may be etched together. Accordingly, the upper portion of the light-blocking member material layer 422m may include the shape of the light-blocking member including the base portion 422a and the tip portion 422b as shown in FIG. 4.

Figure 13:
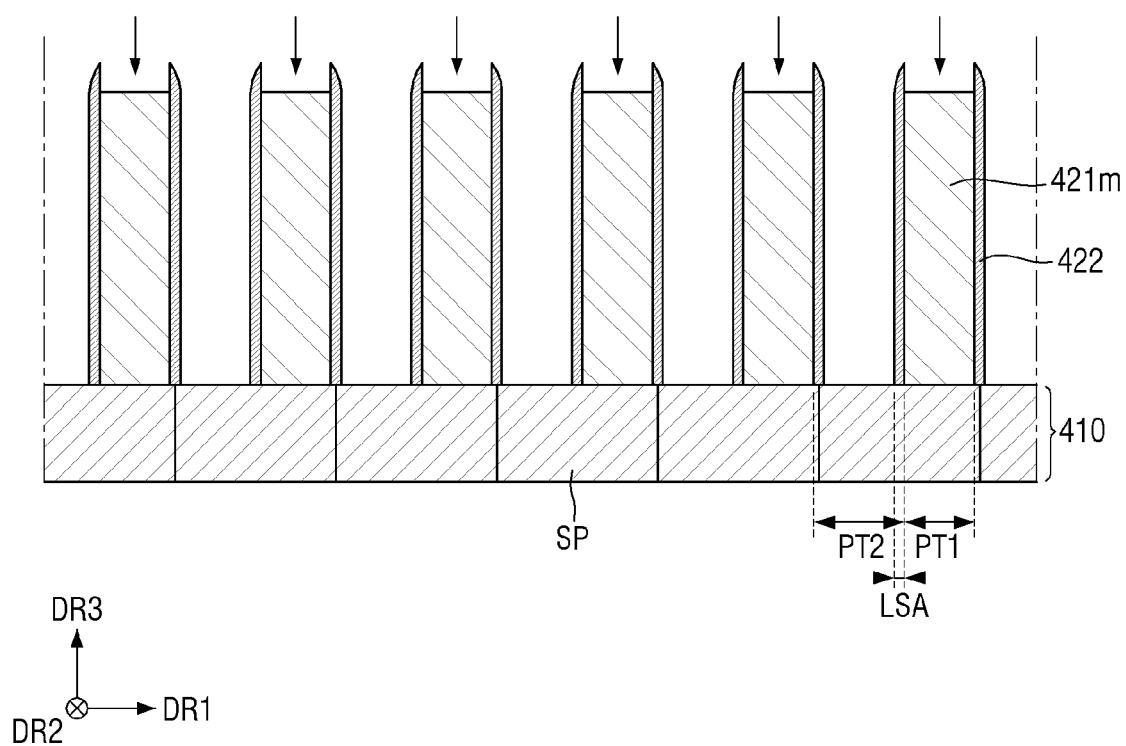

Next, referring to FIG. 13, the mask pattern MS disposed on the first light-transmitting member material layer 421m is removed.

Specifically, the mask pattern MS may be removed by an etching process, and the etching process may be performed by wet etching, but is not limited thereto. When the mask pattern MS is removed, the light-blocking member 422 may protrude upward from the first light-transmitting member material layer 421m material layer in the remaining portion PT1. However, the embodiments are not limited thereto, and according to the process of etching the light-blocking member material layer 422m, the light-blocking member 422 may not protrude upward from the first light-transmitting member material layer 421m in the remaining portion PT1. That is, the first light-transmitting member material layer 421m material layer in the remaining portion PT1 may protrude upward from the light-blocking member 422, or both components may have the same height.

Figure 14:
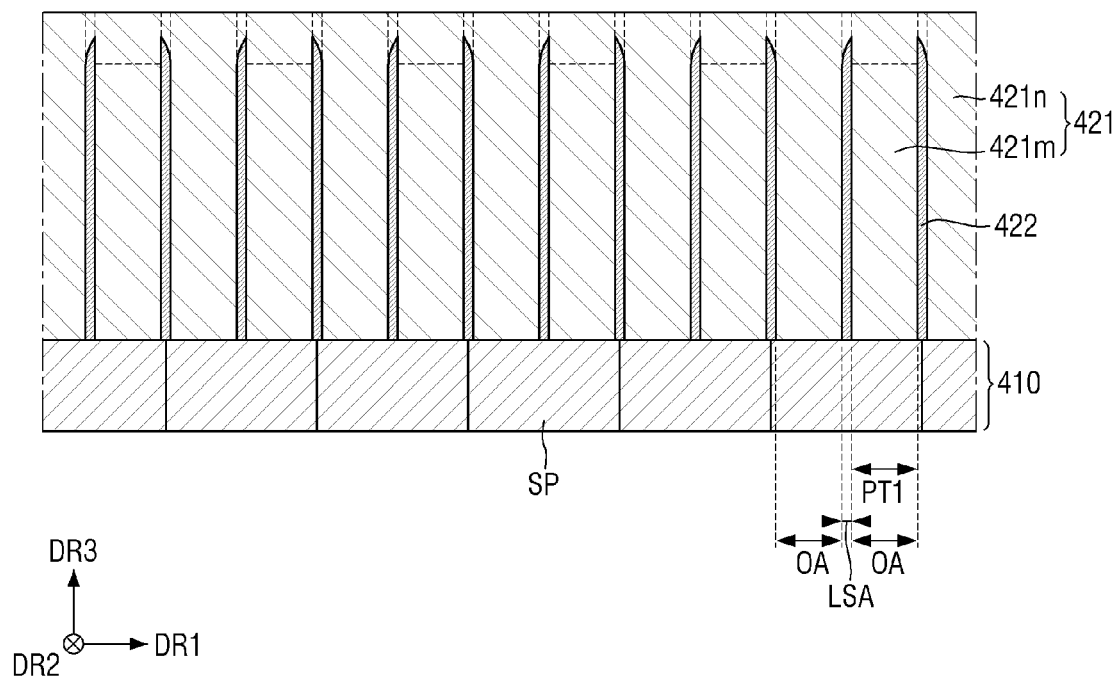

Next, referring to FIG. 14, a second light-transmitting material layer 421n may be additionally formed on the light sensing layer 410 to fill an empty space of the exposed portion PT2.

Specifically, a second light-transmitting material layer 421n may be additionally formed on the first light-transmitting member material layer 421m in the remaining portion PT1 and the light sensing layer 410 provided with the light-blocking member 422. The second light-transmitting material layer 421n may include a material having substantially the same refractive index as the first light-transmitting member material layer 421m. Although the embodiments are not limited thereto, the second light-transmitting material layer 421n may be substantially the same as the first light-transmitting member material layer 421m in the remaining portion PT1.

The second light-transmitting material layer 421n may be formed on the light sensing layer 410, may cover the first light-transmitting member material layer 421m and the light-blocking member 422 in the remaining portion PT, and may be disposed over the entire area of the light sensing layer 410. That is, the second light-transmitting material layer 421n may fill the exposed portion PT2.

All the areas of the first light-transmitting member material layer 421m and the light-blocking member 422 of the remaining portion PT1 may be covered by the second light-transmitting member material layer 421n. The second light-transmitting member material layer 421n may cover both the side surfaces of the first light-transmitting member material layer 421m and the light-blocking member 422 of the remaining portion PT1 and also the upper surfaces thereof. Based on one surface of the light sensing layer 410, the height of the upper surface of the second light-transmitting member material layer 421n may be higher than the height of the first light-transmitting member material layer 421m and the height of the light-blocking member 422 in the remaining portion PT1. That is, the first light-transmitting member material layer 421m and the light-blocking member 422 in the remaining portion PT1 may be immersed in the second light-transmitting member material layer 421n, and the upper surface of the second light-transmitting member material layer 421n may be flat.

The light-transmitting member 421 may include the first light-transmitting member material layer 421m and the second light-transmitting member material layer 421n in the remaining portion PT1. In other words, the first light-transmitting member material layer 421m and the second light-transmitting member material layer 421n in the remaining portion PT1 may form the light-transmitting member 421. As the second light-transmitting member material layer 421n is additionally provided, as shown in FIG. 4, the light-transmitting member 421 may be formed, and the light-transmitting area OA may be formed.

Thereafter, the first light-transmitting member material layer 421m and the second light-transmitting member material layer 421n in the remaining portion PT1 may be dried and cured. The volume of the light-transmitting member material layers 421m and 421n may be reduced according to the drying and curing process, and the amount of the light-transmitting member material layer 421m and 421n may be adjusted in consideration of this phenomenon.

After the first light-transmitting member material layer 421m may be patterned to form the remaining portion PT1, the width of the light-blocking area LSA on which the light blocking material 422 is applied may be formed to be thin, and the second light-transmitting member material layer 421n may be further disposed in an empty space (for example, the exposed portion PT2) other than the remaining portion PT1, thereby increasing the size of the light-transmitting area OA. Accordingly, the amount of light passing through the optical layer 420 and reaching the light sensing layer 410 may be increased.

Hereinafter, other embodiments of the display device will be described. In the following embodiments, descriptions will be omitted or simplified for the same configurations as the previously described embodiment, and differences will be mainly described.

Figure 15:
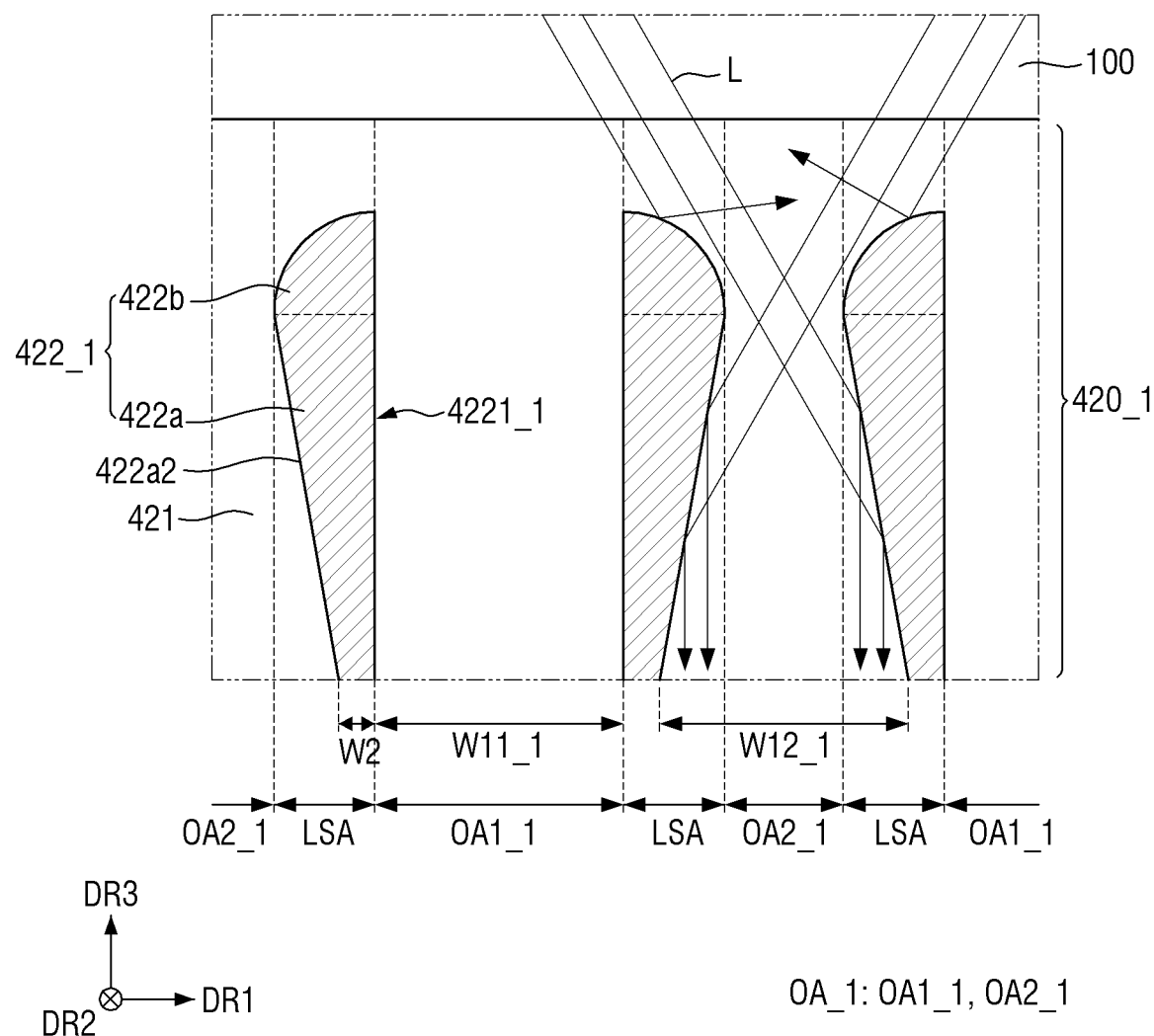
FIG. 15 is a partial, cross-sectional view of another embodiment of the optical layer of the display device of FIG. 3.

FIG. 15 is a partial, cross-sectional view of another embodiment of the optical layer of the display device of FIG. 3.

Referring to FIG. 15, the illustrated embodiment is different from the embodiment of FIG. 4 in that the width W2 of a light-blocking member 422_1 of an optical layer 420_1 according to the illustrated embodiment may increase in a direction toward the top of the light-blocking member 422_1 in a part of the area.

Specifically, the light-blocking member 422_1 of the optical layer 420_1 according to the illustrated embodiment includes a base portion 422a and a tip portion 422b, and the width W2 of the base portion 422a may increase upward. Although this light-blocking member 422_1 may be formed by forming a tip at the upper end of the light-transmitting member material layer 421m (refer to FIG. 11) in the first light-transmitting member area PT (refer to FIG. 11) during the process of forming the light-blocking member material layer 422m (refer to FIG. 11) of FIG. 11, but the embodiments are not limited thereto.

The first unit light-transmitting area OA1_1 and the second unit light-transmitting area OA2_1 may be adjacent to each other. The width W11_1 of the light-transmitting member 421 of the first unit light-transmitting area OA1_1 may be substantially constant, and the width W12_1 of the light-transmitting member 421 of the second unit light-transmitting area OA2_1 may decrease in a direction upward and then increase again. That is, the side surfaces 4221_1 of the light-blocking members 422_1 facing each other in the first unit light-transmitting area OA1_1 may extend in the thickness direction (e.g., third direction DR3) and may be substantially parallel to each other. The one side surfaces 422a2 of the base portions 422a of the light-blocking members 422_1 facing each other in the second unit light-transmitting area OA2_1 may be inclined with respect to the thickness direction, and may become closer to each other in the upward direction. Accordingly, extraneous (noise) light incident from the side surface of the light L incident on the optical layer 420 may be blocked.

Even in this case, since the area of the light-transmitting area OA_1 may increase, the amount of light passing through the optical layer 420_1 and reaching the light sensing layer 410 (refer to FIG. 3) may increase, and the accuracy in recognizing a fingerprint by the fingerprint sensor 400 (refer to FIG. 3) may be improved. Moreover, as one side surface 422a2 of the base portion 422a of the light-blocking member 422_1 is formed to be inclined with respect to the thickness direction, noise light that may reach the light sensing layer 410 (refer to FIG. 3) may be minimized, and thus the accuracy of the fingerprint sensor 400 (refer to FIG. 3) may be further improved.

Figure 16:
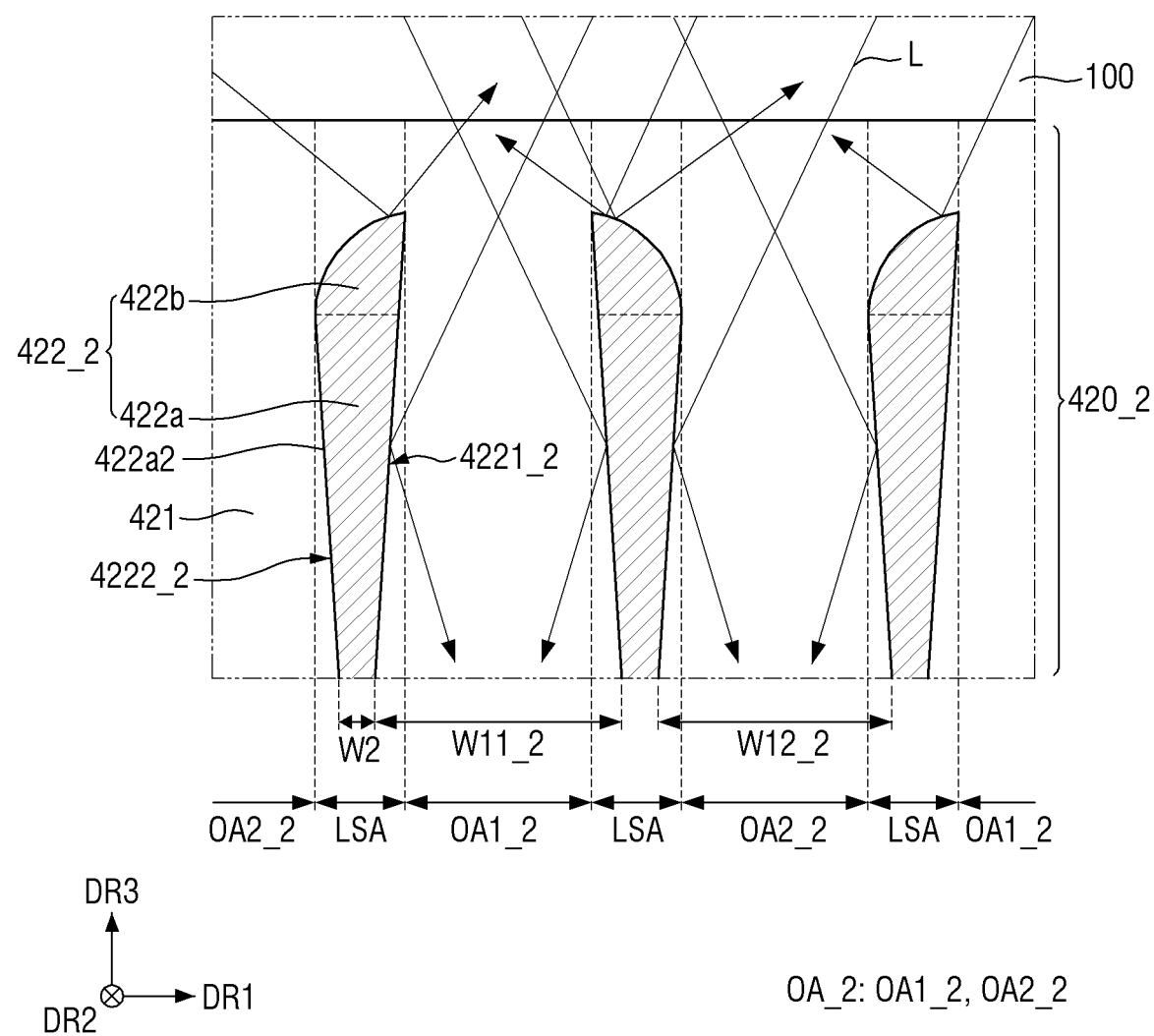
FIG. 16 is a partial, cross-sectional view of still another embodiment of the optical layer of the display device of FIG. 3.

FIG. 16 is a partial, cross-sectional view of still another embodiment of the optical layer of the display device of FIG. 3.

Referring to FIG. 16, the illustrated embodiment is different from the embodiment of FIG. 15 in that both one side surface 4221_2 and the other side surface 4222_2 of a light-blocking member 422_2 of an optical layer 420_2 are inclined with respect to the thickness direction (e.g. third direction DR3).

Specifically, both one side surface 4221_2 and the other side surface 4222_2 of the light-blocking member 422_2 of the optical layer 420_2 according to the illustrated embodiment may be inclined with respect to the thickness direction.

The width W11_2 of the light-transmitting member 421 of the first unit light-transmitting area OA1_2 may decrease upward. The width W12_2 of the light-transmitting member 421 of the second unit light-transmitting area OA2_2 may decrease upwardly and then increase again. That is, the one side surfaces 4222_2 of the light-blocking members 422_2 facing each other in the first unit light-transmitting area OA1_2 may be inclined with respect to the thickness direction, and may become closer to each other upward. Accordingly, noise light incident from the side surface of the light L incident on the optical layer 420 may be blocked.

Even in this case, since the area of the light-transmitting area OA_2 may increase, the amount of light passing through the optical layer 420_2 and reaching the light sensing layer 410 (refer to FIG. 3) may increase, and the accuracy in recognizing a fingerprint by the fingerprint sensor 400 (refer to FIG. 3) may be improved. Moreover, as one side surface 422a2 of the base portion 422a of the light-blocking member 422_2 is formed to be inclined with respect to the thickness direction, noise light that may reach the light sensing layer 410 (refer to FIG. 3) may be minimized, and thus the accuracy of the fingerprint sensor 400 (refer to FIG. 3) may be further improved.

Figure 17:
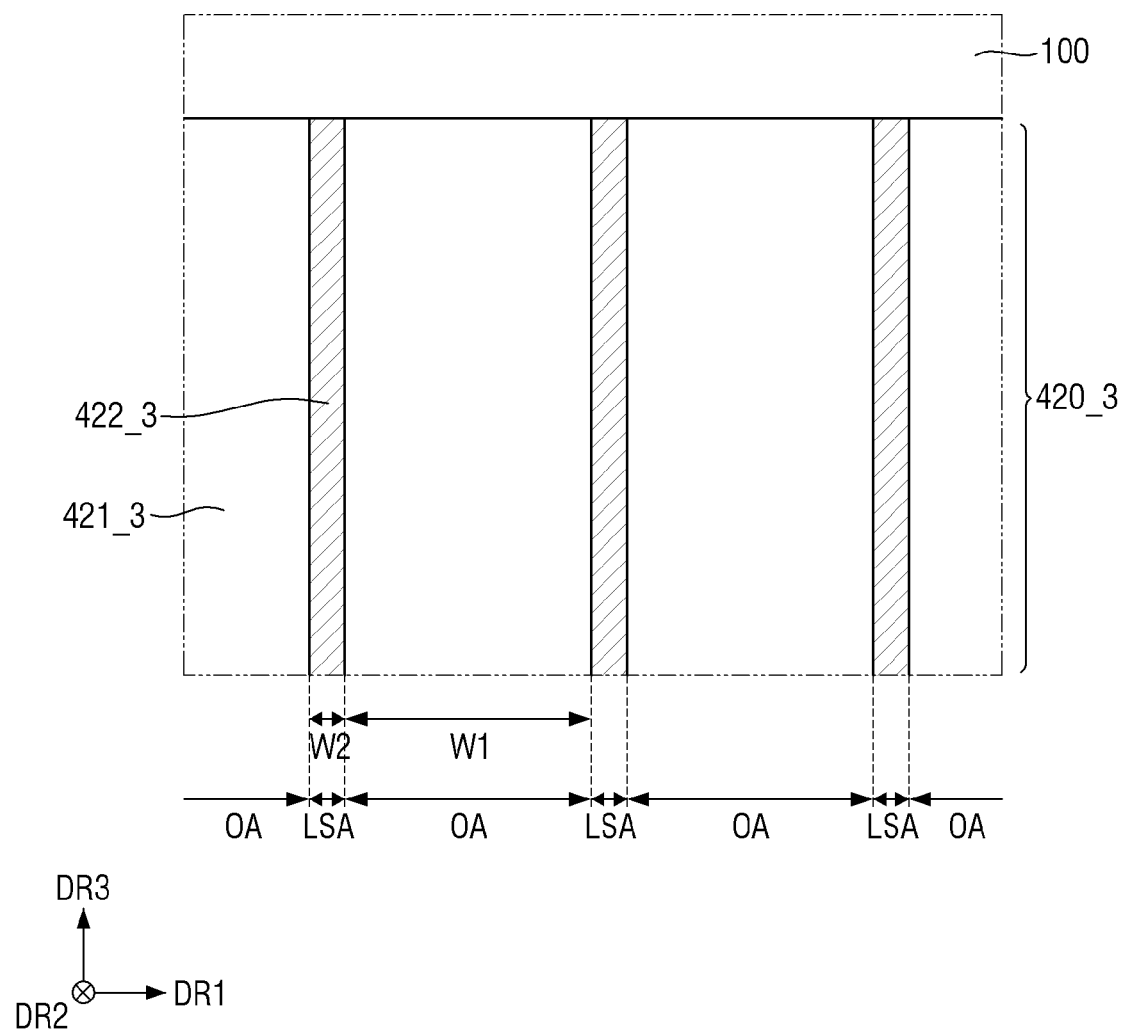
FIG. 17 is a partial, cross-sectional view of still yet another embodiment of the optical layer of the display device of FIG. 3.

FIG. 17 is a partial, cross-sectional view of still yet another embodiment of the optical layer of the display device of FIG. 3.

Referring to FIG. 17, the illustrated embodiment is different from the embodiment of FIG. 3 in that a light-transmitting member 421_3 of an optical layer 420_3 according to the illustrated embodiment is separated by a light-blocking member 422_3.

Specifically, the light-transmitting member 421_3 may be disposed in the light-transmitting area OA, and the light-blocking member 422_3 may be disposed in the light-blocking area LSA. The light-transmitting member 421_3 covers the side surface of the light-blocking member 422_3, but may not cover the upper surface of the light-blocking member 422_3. Further, the upper surface of the light-transmitting member 421_3 and the upper surface of the light-blocking member 422_3 are located at substantially the same height, and may be located in substantially the same plane. The width W1 of the light-transmitting member 421_3 and the width W2 of the light-blocking member 422_3 may be substantially constant.

This light-transmitting member 421_3 may be formed by additionally forming the light-transmitting member material layer 422n (refer to FIG. 14), drying and curing the light-transmitting member material layer 422n, and then removing a part of the upper side of the light-transmitting member material layer 422n. The method of removing a part of the upper side of the light-transmitting member material layer 422n may be performed by a physical and/or chemical method.

Even in this case, since the area of the light-transmitting area OA may increase, the amount of light passing through the optical layer 420_3 and reaching the light sensing layer 410 (refer to FIG. 3) may increase, and the accuracy in recognizing a fingerprint by the fingerprint sensor 400 (refer to FIG. 3) may be improved.

Figure 18:
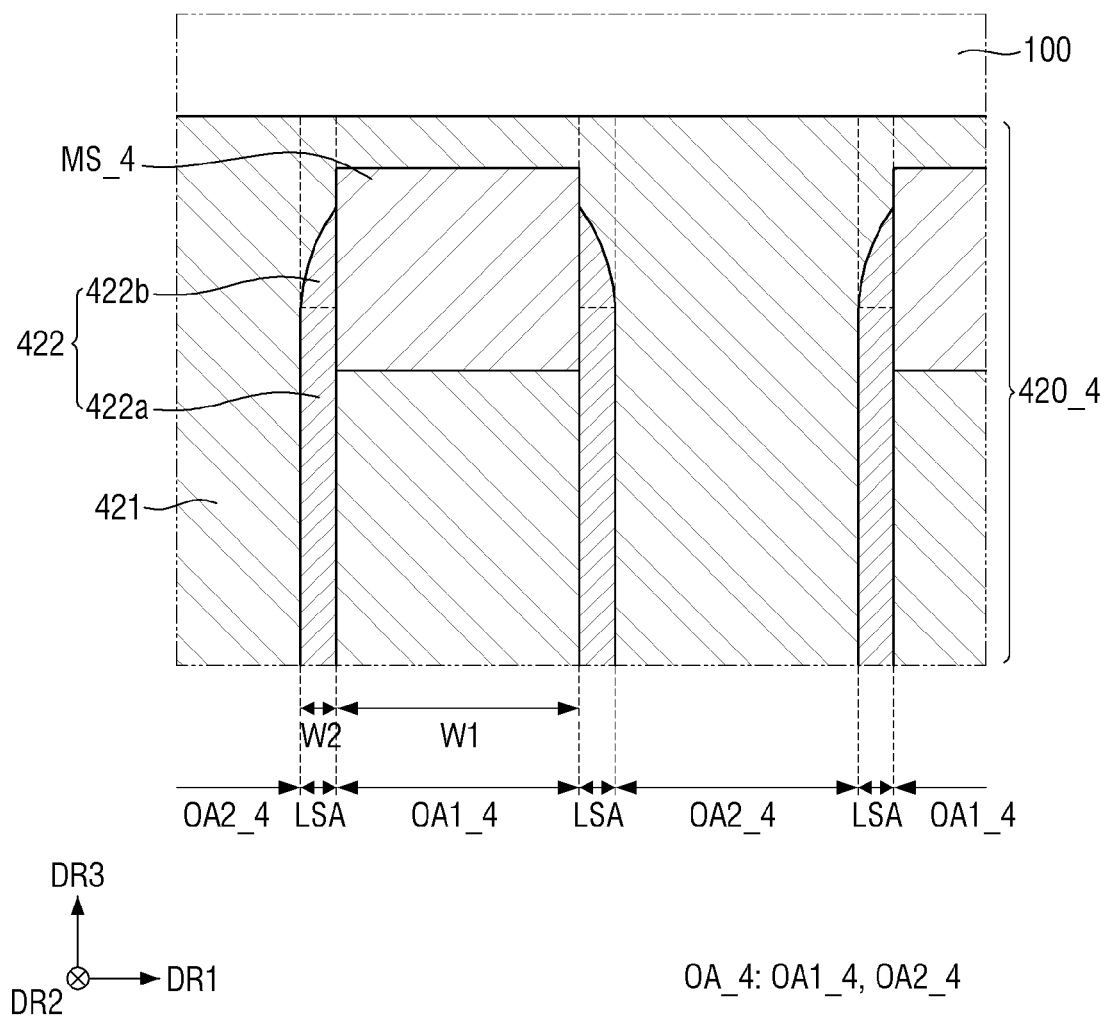
FIG. 18 is a partial, cross-sectional view of still yet another embodiment of the optical layer of the display device of FIG. 3.

FIG. 18 is a partial, cross-sectional view of still yet another embodiment of the optical layer of the display device of FIG. 3.

Referring to FIG. 18, the illustrated embodiment is different from the embodiment of FIG. 3 in that an optical layer 420_4 according to the illustrated embodiment further includes a mask pattern MS_4.

Specifically, the optical layer 420_4 according to the illustrated embodiment may further include a mask pattern MS_4 in a part of the light-transmitting area OA_4. In this case, the mask pattern MS_4 may be optically transparent. The mask pattern MS_4 includes an optically transparent conductive oxide (TCO). For example, the transparent conductive oxide (TCO) may include at least one of indium tin oxide (ITO) and indium zinc oxide (IZO).

The mask pattern MS_4 may be disposed in a part of the light-transmitting area OA_4. In other words, the light-transmitting area OA_4 may include a first unit light-transmitting area OA1_4 and a second unit light-transmitting area OA2_4, and a plurality of first unit light-transmitting areas OA1_4 and a plurality of second unit light-transmitting areas OA2_4 may be provided and may be alternately arranged along the first direction DR1 and the second direction DR2. Among these unit light-transmitting areas, the mask pattern MS_4 may be disposed in the first unit light-transmitting area OA1_4. When the mask pattern MS_4 is transparent, the mask pattern MS shown in FIGS. 9 to 12 may be left without being removed in the step of FIG. 13, and thus the mask pattern MS_4 may be located in the first unit light-transmitting area OA1_4.

As shown in FIG. 18, the light-transmitting member 421 may be disposed under and on the mask pattern MS_4, and at least one of the light-transmitting member 421 and the light-blocking member 422 may be disposed on the side surface of the mask pattern MS_4. The light-transmitting member 421 disposed under the mask pattern MS_4 is substantially the same as the first light-transmitting member material layer 421m (refer to FIG. 14), and the light-transmitting member 421 disposed on the mask pattern MS_4 may be substantially the same as the second light-transmitting member material layer 421n (refer to FIG. 14).

Even in this case, since the area of the light-transmitting area OA may increase, the amount of light passing through the optical layer 420_4 and reaching the light sensing layer 410 (refer to FIG. 3) may increase, and the accuracy in recognizing a fingerprint by the fingerprint sensor 400 (refer to FIG. 3) may be improved. Moreover, since the mask pattern MS_4 may not be removed, the number of processes may be reduced, and process efficiency may be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A fingerprint sensor for a display device, comprising:
a light sensing layer including a light sensing element; and
an optical layer including a light transmitter disposed in a light-transmitting area and a light blocker disposed in a light-blocking area,
wherein the light-transmitting area includes a plurality of unit light-transmitting areas separated by the light-blocking area, and each of the unit light-transmitting areas has a first width and the light-blocking area has a second width, the first width being in a range of about 5 times to about 200 times the second width,
wherein the light blocker comprises a light-blocking member including a base portion and a tip portion connected to the base portion, and
wherein one side surface of the tip portion has a generally round shape.

2. The fingerprint sensor of claim 1,
wherein the first width is in a range of about 1 µm to about 10 µm, and the second width is in a range of about 50 µm to about 200 µm.

3. The fingerprint sensor of claim 1,
wherein the base portion has a substantially constant width, and
wherein the tip portion has a width decreasing in a direction toward an upper end thereof.

4. The fingerprint sensor of claim 3,
wherein the light transmitter comprises a light-transmitting member being further disposed in the light-blocking area, and overlapping the light-blocking member.

5. The fingerprint sensor of claim 1,
wherein the light blocker has a width that increases in a direction toward an upper end thereof, and one of one side surface and the other side surface of the light blocker is inclined with respect to a thickness direction.

6. The fingerprint sensor of claim 5,
wherein the light transmitter has a width that decreases in a direction toward an upper end thereof, and one of one side surface and the other side surface of the light transmitter is inclined with respect to the thickness direction.

7. The fingerprint sensor of claim 1,
wherein the light blocker comprises a metal material.

8. The fingerprint sensor of claim 7,
wherein the metal material comprises titanium (Ti).

9. A display device, comprising:
a display panel; and
a fingerprint sensor disposed on one surface of the display panel,
wherein the fingerprint sensor comprises:
a light sensing layer including a light sensing element; and
an optical layer including a light transmitter and a light blocker surrounding the light transmitter,
wherein the light blocker includes a base portion having a substantially constant width and a tip portion connected to the base portion and having a width decreasing in a direction toward an upper end thereof, and
wherein one side surface of the tip portion has a generally round shape.

10. The display device of claim 9,
wherein the light transmitter has a first width and the light blocker has a second width, the first width being in a range of about 5 times to about 200 times the second width.

11. The display device of claim 10,
wherein the first width is in a range of about 1 µm to about 10 µm, and the second width is in a range of about 50 nm to about 200 nm.

12. The display device of claim 9,
wherein the light blocker comprises a metal material.

* * * * *